(12) United States Patent
Suzuki et al.

(10) Patent No.: US 6,467,458 B1
(45) Date of Patent: Oct. 22, 2002

(54) START CONTROL APPARATUS FOR AN INTERNAL COMBUSTION ENGINE AND FUEL NATURE DETERMINATION APPARATUS

(75) Inventors: Naoto Suzuki, Fujinomiya; Toshio Inoue, Gotenba; Masakiyo Kojima; Katsuhiko Hirose, both of Susono, all of (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/571,017

(22) Filed: May 15, 2000

(30) Foreign Application Priority Data

May 24, 1999 (JP) .......................................... 11-143209
Sep. 13, 1999 (JP) .......................................... 11-259467

(51) Int. Cl.[7] .............................................. F02M 51/00
(52) U.S. Cl. ...................................... 123/491; 123/685
(58) Field of Search ................................. 123/491, 685, 123/686, 179.16, 179.17, 179.18

(56) References Cited

FOREIGN PATENT DOCUMENTS

| JP | HEI 9-209818 | 8/1997 |
| JP | HEI 11-50893 | 2/1999 |

*Primary Examiner*—John Kwon
(74) *Attorney, Agent, or Firm*—Kenyon & Kenyon

(57) ABSTRACT

A start control apparatus for an internal combustion engine which guarantees excellent startability regardless of the nature of the fuel used. In addition, a fuel nature determining apparatus designed to prevent mistakes in the determining of the nature of the fuel. When conditions for beginning the starting of an internal combustion engine have been established, normal start control is performed in order to start the internal combustion engine. After the starting of the internal combustion engine has begun using the normal start control, if the starting is completed within a predetermined length of time, a determination is made that the fuel supplied to the internal combustion engine is of a light nature. If, however, the starting is not completed within a predetermined length of time, a determination is made that the fuel supplied to the internal combustion engine is of a heavy nature. In this case, after a predetermined length of time has elapsed, heavy fuel start control is performed in place of the normal start control so that the starting of the internal combustion engine will be quickly completed. According to the above method, the nature of the fuel is detected before the starting of the internal combustion engine is completed and, when the fuel is of a heavy nature, the start control can be altered to control which corresponds to the nature of the fuel.

18 Claims, 11 Drawing Sheets

START CONTROL APPARATUS FOR AN INTERNAL COMBUSTION ENGINE AND FUEL NATURE DETERMINATION APPARATUS

INCORPORATION BY REFERENCE

The disclosures of Japanese Patent Application Nos. HEI 11-143209 filed on May 24, 1999, and HEI 11-259467 filed on Sep. 13, 1999 including the specifications, drawings, and abstracts are incorporated herein by reference in their entirety.

BACKGROUND OF THE INVENTION

1. Field of the Invention

The present invention relates to a start control apparatus for an internal combustion engine and a fuel nature determination apparatus. In particular, this invention relates to a start control apparatus for an internal combustion engine capable of performing a plurality of start controls when starting an internal combustion engine and to a fuel nature determination apparatus for determining the nature of fuel supplied to an internal combustion engine.

2. Description of the Related Art

As is described in Toyota Technical Review (Publication No. 4139 (Date of Publication Mar. 29, 1991)), for example, an apparatus for correcting a fuel injection amount in accordance with the nature of fuel supplied to an internal combustion engine is known. Fuel supplied to an internal combustion engine may be fuel containing a large amount of low volatility components (referred to below as heavy fuel) or fuel containing a large amount of high volatility components referred to below as light fuel). In comparison with light fuel, heavy fuel is unlikely to vaporize. Therefore, when heavy fuel is used, the concern exists that stable operation of the internal combustion engine will not be achieved. In the apparatus of the above related art, the time from when the internal combustion engine is started (for example, from when a starter switch is turned on by an operator) until the internal combustion engine actually begins to run (start time) is detected. Then, on the basis of this start time, a determination is made as to whether or not the fuel is of a heavy nature. The amount of fuel injected into the internal combustion engine is then corrected in accordance with the determined nature of the fuel. Accordingly, stable operation of an internal combustion engine can be guaranteed regardless of the nature of the fuel.

As described above, in the above apparatus, the nature of the fuel is determined based on the start time. Namely, the nature of the fuel is not determined if the internal combustion engine is not running. Accordingly, if an attempt is made to start an internal combustion engine using normal start control when the fuel is of a heavy nature, a considerable length of time passes before the engine is running and the concern arises that superior starting is difficult to guarantee.

SUMMARY OF THE INVENTION

The present invention was achieved in view of the above points. It is an object of the present invention to provide a start control apparatus for an internal combustion engine capable of ensuring superior starting regardless of the nature of the fuel. It is a further object of the present invention to provide a fuel nature determination apparatus capable of suitably determining the nature of fuel in the apparatus.

In order to achieve the first object above, the starting operation control apparatus for an internal combustion engine of the present invention includes a controller that capably selects and executes a starting operation from at least a first and second starting operation in accordance with a nature of fuel supplied to an internal combustion engine and a sensor that detects a running state of the internal combustion engine. When the sensor does not detect that the internal combustion engine is running within a predetermined time after starting of an internal combustion engine is begun using the first starting operation, the controller switches the starting operation to the second starting operation.

In this case, for example, when the fuel exhibits high volatility (light fuel), the controller selects the first starting operation and when the fuel exhibits low volatility (heavy fuel), the controller selects the second starting operation.

According to the above aspect, if there is no operation within a predetermined time when the internal combustion engine is started using the first start control which corresponds to light fuel, then it is possible to determine that it will take some time for the starting operation of the internal combustion engine to be completed (i.e., it will take some time until the engine is running) because the fuel is of a heavy nature. In this case, by switching the start control from the first start control to the second start control which corresponds to heavy fuel, it is possible to ensure that the internal combustion engine will be started even if the fuel is of a heavy nature.

In order to achieve the second object of the present invention, the fuel nature determination apparatus for determining the nature of fuel supplied to an internal combustion engine of the present invention further includes a torque controller that limits the output torque of an internal combustion engine after the internal combustion engine is running, and a fuel nature determining apparatus for determining the nature of fuel based on parameters which correspond with the output torque after the internal combustion engine is running and a predetermined threshold value. Further, the fuel nature determining apparatus alters the threshold value when the torque controller limits the output torque.

When the output torque is limited, the concern exists that the determination of the nature of the fuel determined on the basis of parameters which correspond to the output torque may be in error. According to the above aspect, when the output torque is limited, a threshold value for determining the fuel nature is altered. Consequently, even if the parameters vary due to the torque limitation, the possibility of mis-determination of the fuel nature may be minimized.

BRIEF DESCRIPTION OF THE DRAWINGS

The foregoing and other objects, features and advantages of the invention will become apparent from the following description of preferred embodiments with reference to the accompanying drawings in which.

DESCRIPTION OF THE PREFERRED EMBODIMENTS

Embodiments of the present invention will now be explained with reference to the drawings.

Figure 1:
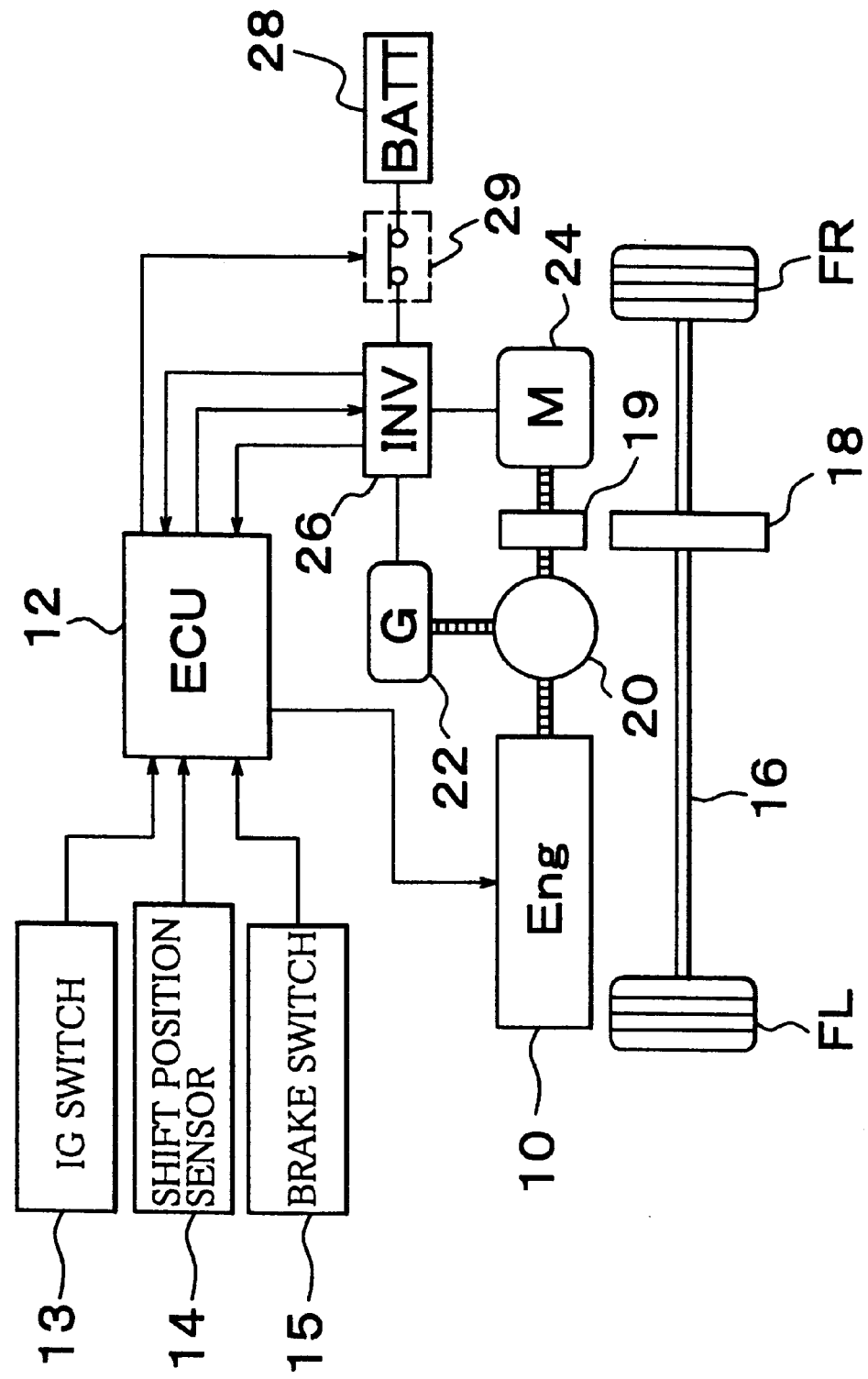
FIG. 1 is a typical view of a drive mechanism of a vehicle having an internal combustion engine to which an embodiment of the present invention is applied.
Figure 2:
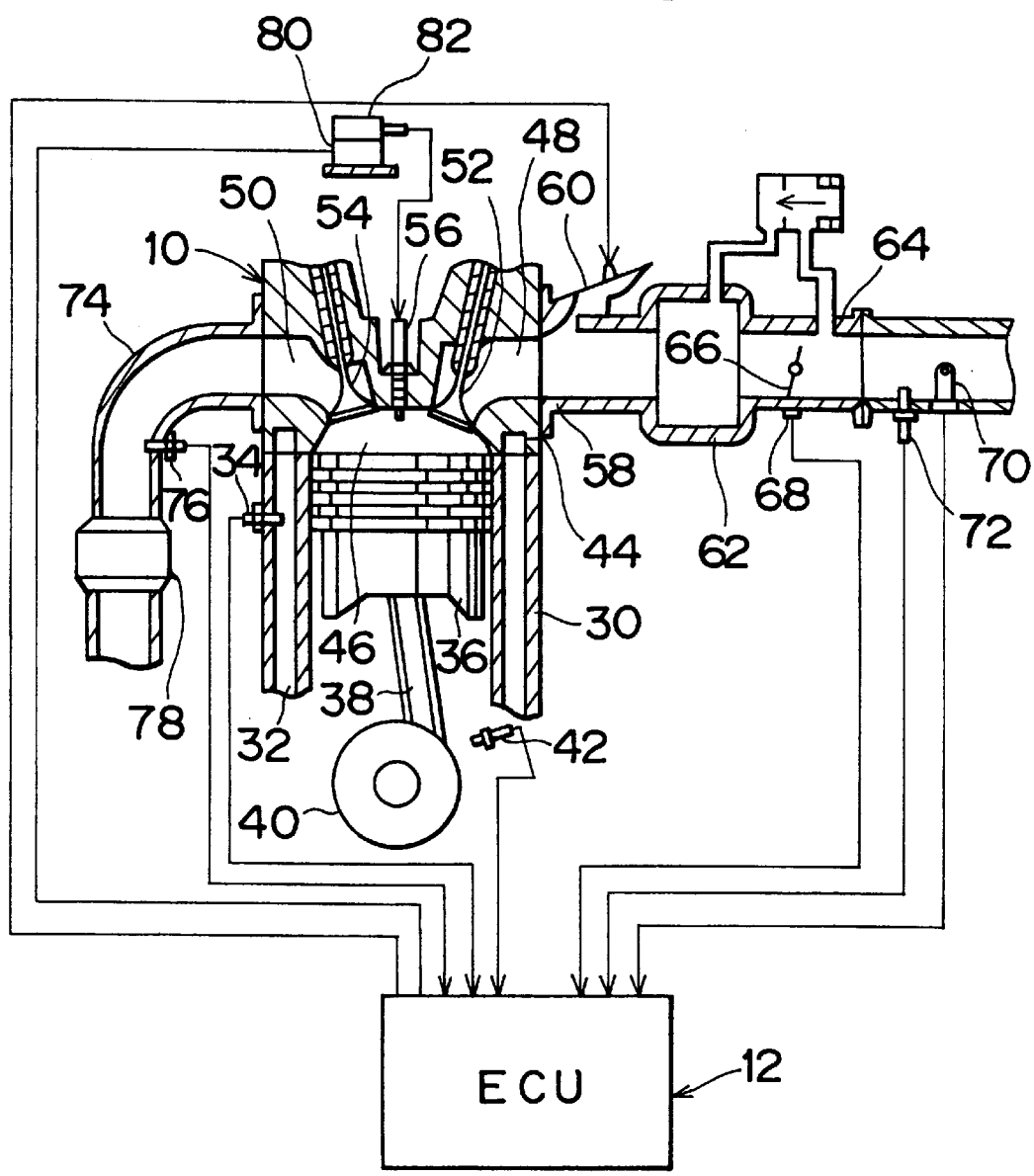
FIG. 2 is a structural view of an internal combustion engine to which an embodiment of the present invention is applied.

FIG. 1 is a typical view showing a drive mechanism of a vehicle in which an internal combustion engine 10 provided with a control system of the first embodiment of the present invention is mounted. FIG. 2 is a structural view of the internal combustion engine 10. The system of the present embodiment is provided with an electronic control unit (referred to below as an ECU) 12 and is controlled by the ECU 12.

An ignition switch (referred to below as an IG switch) 13 for switching a vehicle between start and stop is connected to the ECU 12. An accessory switch, an on switch, and a starter switch are built into the IG switch 13. The ECU 12 determines whether or not the starter switch is in an on state based on an output signal from the IG switch 13.

A shift position sensor 14 for outputting a signal in accordance with the transmission shift position and a brake switch 15 which outputs an on signal when the brake pedal is operated are connected to the ECU 12. The ECU 12 determines whether or not the shift position is in the parking range (P range) based on an output signal from the shift position sensor 14. The ECU 12 also determines whether or not the brake pedal is being operated based on an output signal from the brake switch 15.

In the present embodiment, when both the shift position is in the P range and the brake pedal is being operated, the vehicle is in a start state at the point when the starter switch is in an on state. After the starting is begun, the internal combustion engine 10 is placed in a running state until the warming up thereof is completed. When the warming up is completed the internal combustion engine 10 is placed in a stopped state.

As is shown in FIG. 1, the left wheel FL and right wheel FR of a vehicle are connected via an axle 16. A reduction gear 18 is attached to the axle 16. A planetary gear mechanism 20 is engaged with the reduction gear 18 via a gear 19. An internal combustion engine 10 serving as a drive source as well as a generator 22 and auxiliary motor 24 are mounted in the vehicle. The planetary gear mechanism 20 is provided with a planetary carrier which communicates with an output shaft of the internal combustion engine 10, a sun gear which is connected to an output shaft of the generator 22, and a ring gear which communicates with an output shaft of the auxiliary motor 24. The generator 22 and auxiliary motor 24 are electrically connected to a battery 28 via an inverter 26. A main relay 29 is provided between the inverter 26 and the battery 28. The main relay 29 has the function of being driven by the ECU 12 to operate or shut off an electrical source circuit from the battery 28 to the inverter 26.

The inverter 26 has the function of converting 3-phase alternating current and direct current using 3-phase bridge circuits formed from a plurality of power transistors between the battery 28 and generator 22 and between the battery 28 and auxiliary motor 24. When the power transistors within the inverter 26 are driven, the generator 22 and auxiliary motor 24 are controlled to a number of revolutions which accords with the frequency of the alternating current and generate torque which corresponds to the size of the current.

When the internal combustion engine 10 is not running (cannot start), the generator 22 functions as a starter motor to start the internal combustion engine 10 using power supplied from the battery 28 via the inverter 26. Further, after the internal combustion engine 10 has started, the generator 22 functions as a power generator by using the output from the internal combustion engine 10 to generate power and supplying the power to the battery 28 or auxiliary motor 24 via the inverter 26. During normal running of the vehicle, the auxiliary motor 24 is supplied with the appropriate power and functions as an electric motor for applying torque, which supplements the output power from the internal combustion engine 10, to the axle 16. The auxiliary motor 24 also functions as a power generator by using the rotation of the axle 16 during braking of the vehicle to generate power and supplying the power to the battery 28 via the inverter 26.

According to the above structure, a portion of the kinetic energy of the internal combustion engine 10 is converted into electrical power by the generator 22 or a portion of the kinetic energy during deceleration is converted into electrical power by the auxiliary motor 24 and is recovered by the battery 28. As a result, the battery 28 can be recharged without providing a separate charger externally of the battery 28.

A current detection circuit for detecting the value of current supplied to the generator 22 and a voltage detection circuit for detecting the value of voltage applied to the generator 22 are built into the inverter 26. The inverter 26 is also provided with a current detection circuit for detecting the value of current supplied to the auxiliary motor 24 and a voltage detection circuit for detecting the value of voltage applied to the auxiliary motor 24. Signals for the detected current and voltage values are output to the ECU 12. The ECU detects the values of current and voltage applied to the generator 22 and auxiliary motor 24 based on the above output signals and also detects the output torque of the generator 22 and auxiliary motor 24 based on these values. In the description below, the polarity of the output torque STG when the generator 22 is functioning as an electric motor is set as positive, while the polarity of the output torque STG when the generator 22 is functioning as a generator is set as negative. Note that the output torque STG of the generator 22 is converted into a corresponding amount of power by reversing the positive and negative polarities.

In this way, in the present embodiment, a hybrid car which runs using a suitable combination of the two power sources of the internal combustion engine 10 and the auxiliary motor 24 is formed. Namely, in the present embodiment, in conditions where the engine efficiency is reduced such as when accelerating or when traveling at low speed, the ECU 12 maintains the stopped state of the internal combustion engine 10 and generates torque for running the vehicle in the auxiliary motor by supplying electric power from the battery 28 to the auxiliary motor 24 via the inverter 26. The ECU 12 also calculates the required driving force needed by the vehicle based on the extent that the accelerator is operated and the speed of the vehicle. Further, the ECU 12 causes the internal combustion engine 10 to run in an efficient operating range relative to the driving force and controls the torque ratios of the internal combustion engine 10 and auxiliary motor 24 relative to the axle 16.

The structure of the internal combustion engine 10 will now be described.

As is shown in FIG. 2, the internal combustion engine 10 is provided with a cylinder block 30. A water jacket 32 is formed inside the wall of the cylinder block 30. A water temperature sensor 34 whose distal end portion is exposed to the inside of the water jacket 32 is provided in the cylinder block 30. The water temperature sensor 34 outputs a signal to the ECU 12 in accordance with the temperature of cooling water flowing inside the water jacket 32. The ECU 12 detects the water temperature THW of the cooling water of the internal combustion engine 10 based on the output signals of the water temperature sensor 34.

The same number of pistons 36 as there are cylinders are housed inside the cylinder block 30. A crankshaft 40 is connected to the pistons 36 via connecting rods 38. A crank angle sensor 26 is provided inside the cylinder block 30 such that the distal end thereof faces the surface of the crankshaft 40. The crank angle sensor 42 generates a reference signal each time the angle of rotation of the crankshaft 40 reaches a reference angle of rotation. The crank angle sensor 42 also outputs a pulse signal each time the crankshaft 40 rotates at a predetermined angle of rotation (e.g. 30° CA). The ECU 12 detects the number of engine rotations NE and the crank angle CA of the internal combustion engine based on the output signals of the crank angle sensor 42.

A cylinder head 44 is fixed to the top end of the cylinder block 30. A combustion chamber 46 is formed in an area surrounded by the cylinder block 30, the cylinder head 44, and the pistons 36. An inlet port 48 and an exhaust port 50 which communicate with the combustion chamber 46 are formed in the cylinder head 44. An intake valve 52 for opening and closing communication between the cylinder head.44 and the inlet port 48, an exhaust valve 54 for opening and closing communication between the exhaust port 50 and the combustion chamber 46, and an ignition plug 56 whose distal end is exposed to the combustion chamber 46 are built into the cylinder head 44. An intake valve 52, exhaust valve 54, and ignition plug 56 are provided for each of the cylinders in the internal combustion engine 10. The intake valve 52 and exhaust valve 54 are each opened and closed at a predetermined timing synchronous with the rotation of the crankshaft 40 by a cam mechanism (not shown). Note that, in the present embodiment, the cam mechanism for the intake valve 52 is structured such that the phase thereof can be varied at a predetermined angle to the advance angle side and to the retard angle side.

An intake manifold 58 communicates with the inlet port 48. An injector 60 is provided in the intake manifold 58. A fuel pump is connected to the injector 60 via an unillustrated fuel pipe. The ECU 12 is electrically connected to the injector 60. The ECU 12 supplies drive signals to the injector 60 so that fuel injection in accordance with the running state of the internal combustion engine 10 is performed. The injector 60 injects a suitable amount of fuel at a suitable timing into the intake manifold 58 in accordance with the drive signals from the ECU 12.

An inlet passage 64 communicates with the intake manifold 58 via a surge tank 62. A throttle valve 66 which is opened and closed linked with an unillustrated accelerator pedal is provided inside the inlet passage 64. The throttle valve 66 opens and closes using a throttle motor 67 electrically connected to the ECU 12 as a drive source. The throttle motor 67 opens and closes the throttle valve 66 in accordance with drive signals from the ECU 12.

A throttle position sensor 68 is provided adjacent to the throttle valve 66. The throttle position sensor 68 outputs a signal corresponding to the opening degree of the throttle valve 66 to the ECU 12. The ECU 12 detects the throttle opening angle θ based on the output signals of the throttle position sensor 68.

An airflow meter 70 and inlet temperature sensor 72 are further provided inside the inlet passage 64. The airflow meter 70 outputs a signal which corresponds to the intake air flow of air passing through the inlet passage 64 to the ECU 12. The inlet temperature sensor 72 outputs a signal in accordance with the temperature of the air passing through the inlet passage 64 to the ECU 12. Based on the output signals of the airflow meter 70 and the inlet temperature sensor 72, the ECU 12 detects the intake airflow volume VA and intake temperature THA of air flowing into the internal combustion engine 10.

An exhaust manifold 74 communicates with the exhaust port 50 of the internal combustion engine 10. An $O_2$ sensor 76 is provided in the exhaust manifold 74. The $O_2$ sensor 76 outputs a signal in accordance with the concentration of oxygen in the exhaust gas. The richer in fuel the air-fuel ratio of the air/fuel mixture supplied to the internal combustion engine 10, the thinner the concentration of oxygen in the exhaust gas. Similarly, the leaner in fuel the air-fuel ratio of the air/fuel mixture supplied to the internal combustion engine 10, the greater the concentration of oxygen in the exhaust gas. The $O_2$ sensor 76 outputs a HIGH signal (approximately 0.9 v) to the ECU 12 when the air-fuel ratio of the air/fuel mixture supplied to the internal combustion engine 10 is rich compared to the "target air-fuel ratio" at which the catalytic converters described below are determined to function effectively, and outputs a LOW signal (approximately 0.1 v) to the ECU 12 when the air-fuel ratio is lean compared to the target air-fuel ratio.

Based on the output signals from the $O_2$ sensor 76, the ECU 12 determines whether the air-fuel ratio of the air/fuel mixture supplied to the internal combustion engine 10 is rich or lean. A catalytic converter 78 for cleaning the exhaust gas using three way catalyst is connected to the exhaust manifold 74. After exhaust gas expelled from the internal combustion engine 10 has been cleaned by passing through the catalytic converter 78, it is discharged into the atmosphere.

The internal combustion engine 10 is provided with an igniter 80 and an ignition coil 82 for each cylinder. The igniter 80 is connected electrically to the ECU 12. When ignition is to be performed in each of the cylinders, a primary current is supplied to the ignition coil 82 synchronously with ignition signals output from the ECU 12. When the primary current is supplied to the ignition coil 82, a high voltage ignition signal is generated in the secondary coil side of the ignition coil 82. The above ignition plug 56 is connected to the secondary coil side of the ignition coil 82. When the high voltage ignition signal is supplied from the ignition coil 82, the ignition plug 56 generates a spark inside the combustion chamber 46.

In the present embodiment, at the point when the starter switch is in an on state, the internal combustion engine 10 is started. When the internal combustion engine 10 is started, cranking of the internal combustion engine 10 is begun by energizing the generator 22, and a predetermined amount of fuel is injected into the internal combustion engine 10 at a predetermined timing. In addition, a spark is generated from the ignition plug 56 at a predetermined timing. When the starting of the internal combustion 10 is completed (i.e. when the engine is running), the fuel injection amount calculated on the basis of the running state of the internal combustion engine 10 is corrected so that the air-fuel ratio is set at the target air-fuel ratio. Fuel injection is then performed in accordance with this correction amount. In the description below, the control to correct the fuel injection amount so that the air-fuel ratio is set at the target air-fuel ratio is referred to as air-fuel ratio feedback control (air-fuel ratio F/B control).

Fuels of various natures from difficult to vaporize heavy fuel to easily vaporized light fuel exist as the fuel supplied to the internal combustion engine 10. When the nature of the fuel is heavy, if fuel injection is carried out in the internal combustion engine 10 without any consideration given to the nature of the fuel, the concern exists that stable running of the internal combustion engine will not be obtained. In particular, if the same start control when starting the internal combustion engine 10 is performed as for when the nature of the fuel is light, the fuel may not be sufficiently vaporized and it may take some time until the internal combustion engine 10 is in operation. Accordingly, in order to bring the internal combustion engine 10 quickly into operation, the nature of the fuel at startup needs to be detected accurately and the initial start control needs to be altered to a start control appropriate for the nature of the fuel.

A method for detecting the nature of the fuel may be considered in which the nature of the fuel is detected based on the length of the start time from when the internal combustion engine 10 is started until it is actually running. However, in a method such as this, it is not possible to detect the nature of the fuel unless the internal combustion engine 10 is running. Accordingly, it is not possible to perform an appropriate start control corresponding to the nature of the fuel and the fear is that it will not be possible to start the internal combustion engine 10.

In contrast to this, in the system of the present embodiment, a determination is made as to whether or not the nature of the fuel supplied to the internal combustion engine 10 is heavy based on whether or not the internal combustion engine 10 is running within a predetermined time after the internal combustion engine 10 has been started. If the internal combustion engine 10 is not running within the predetermined time and the nature of the fuel has been determined to be heavy, then the following processings are performed in order to quickly start the internal combustion engine 10.

(1) Processing to maximize the valve overlap of the intake valve 52 and exhaust valve 54 by setting the opening and closing timing of the intake valve 52 to the maximum advance angle as compared with normal (referred to below as "valve opening advance angle processing").

(2) Processing to perform the fuel injection when opening the intake valve 52 (referred to below as "intake synchronous injection processing").

(3) Processing to increase the amount of fuel injection as compared with normal (referred to below as "injection amount increase processing").

In the description below, the start control for an internal combustion engine to perform the above processings (1) to (3) are referred to as "heavy fuel start control".

According to the aforementioned system, it is possible to reliably detect the nature of the fuel each time the internal combustion engine is started. Moreover, when the fuel is of a heavy nature, heavy fuel start control can be performed in place of normal start control. When the heavy fuel start control is performed, because vaporization of the fuel is easier than in the normal start control, the internal combustion engine 10 is quickly started.

When, however, the fuel used in the previous starting of the internal combustion engine 10 was of a heavy nature, then, provided that the vehicle is not thereafter supplied with new fuel, the heavy nature of the fuel is maintained. Therefore, in the system of the present embodiment, in order to quickly start the internal combustion engine 10, the nature of the fuel used in the previous starting is stored and, if the nature of that fuel was heavy, heavy fuel start control is performed immediately after the starting of the internal combustion engine 10.

Even if heavy fuel start control is performed immediately after the starting of the internal combustion engine 10, it is still necessary to accurately detect the nature of the fuel during starting. However, when heavy fuel start control is performed immediately after the starting of the internal combustion engine 10, the internal combustion engine 10 is rapidly set in operation regardless of the nature of the fuel. Therefore, it is not appropriate to make the determination as to whether or not the fuel is of a heavy nature on the basis of whether or not the internal combustion engine 10 is running within a predetermined time after being started, as described above.

The rotation of the internal combustion engine 10 tends to be more unstable as the nature of the fuel becomes heavier. As described above, in the present embodiment there is provided a generator 22 which generates power using the output of the internal combustion engine 10. Because of this, when the fuel is of a heavy nature, the amount of power generated by the generator 22 after the internal combustion engine 10 is running decreases (i.e. power generation is difficult) and, when the fuel is of a light nature, the amount of power generated by the generator 22 increases.

Therefore, in the present embodiment, when heavy fuel start control is performed immediately after the starting of the internal combustion engine 10 is begun, the detection of the nature of the fuel is performed based on the amount of power generated by the generator 22 instead of on whether or not the internal combustion engine 10 is running within a predetermined time after startup has begun. Assuming that, even when normal start control is performed, the nature of the fuel is detected based on the amount of power generated by the generator 22, and if the fuel is actually of a heavy nature, the fear is that the internal combustion engine will not run, namely, that the generator 22 will not generate power. Therefore, in the system of the present embodiment, when normal start control is performed, the nature of the fuel is detected based on whether or not the starting of the internal combustion engine 10 is completed within a predetermined time after the starting is begun, as described above, and the nature of the fuel is not detected based on the amount of power generated by the generator 22.

Figure 3:
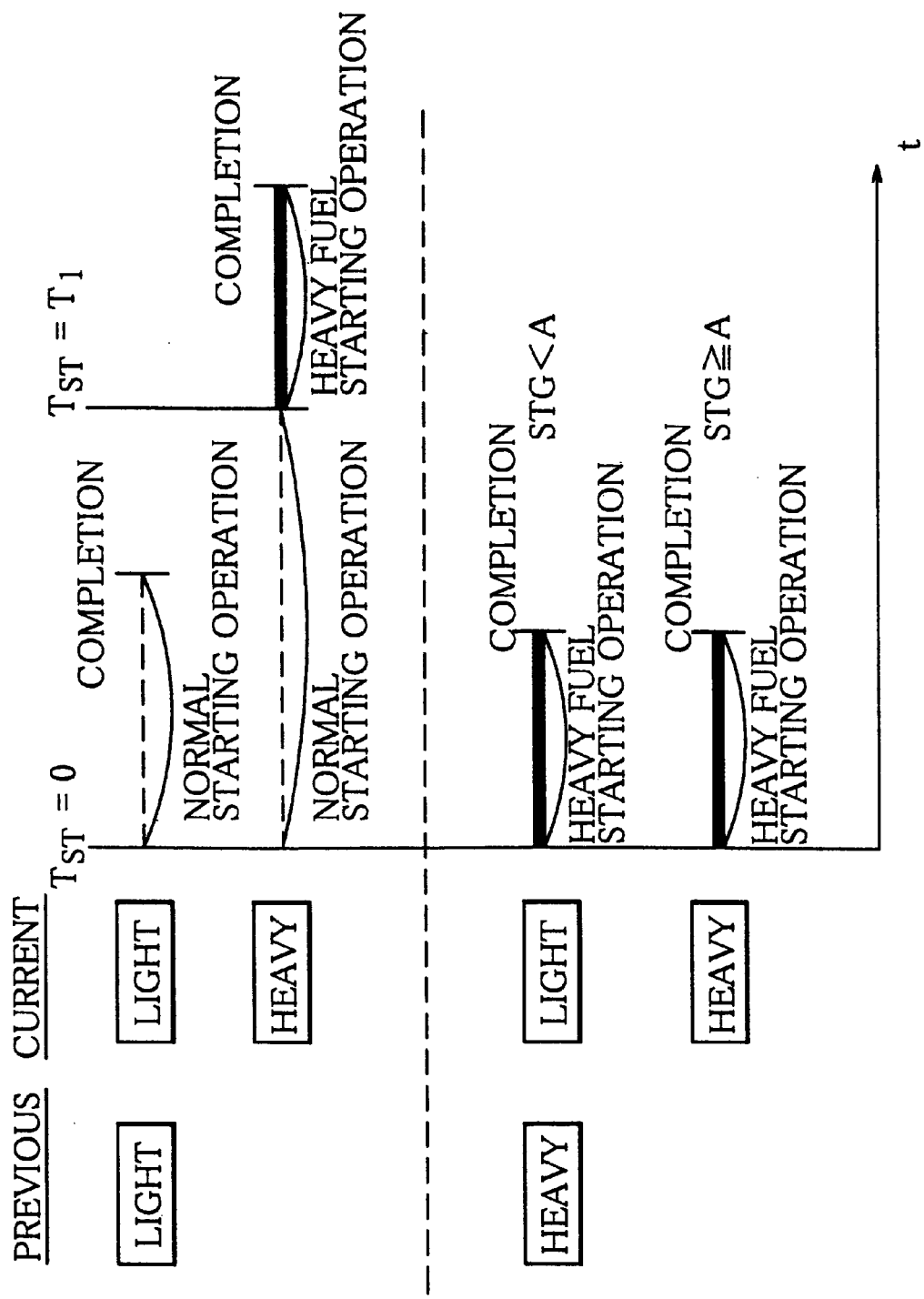
FIG. 3 is a typical view of a fuel nature detection method.

FIG. 3 is a typical view showing the method of detecting fuel nature used in the present embodiment. Note that the top half of FIG. 3 shows the detection when the nature of the fuel used in the previous starting of the internal combustion engine 10 was light, while the bottom half of FIG. 3 shows the detection when the nature of the fuel used in the previous starting of the internal combustion engine 10 was heavy.

As is shown in FIG. 3, when the nature of the fuel used in the previous starting of the internal combustion engine 10 was light, the starting of the internal combustion engine is begun ($T_{ST}$=0) using normal start control. When the starting of the internal combustion engine 10 is completed within a predetermined time ($T_{ST}$=1) (i.e. when the engine is running), the determination is made that the current fuel is of a light nature. When the starting of the internal combustion engine 10 is not completed within a predetermined time, the determination is made that the current fuel is of a heavy nature. Moreover, in place of the start control, heavy fuel start control is executed in order to start the internal combustion engine 10 rapidly.

Moreover, when the fuel used in the previous starting of the internal combustion engine 10 was of a heavy nature, the starting of the internal combustion engine is begun ($T_{ST}$=0) using heavy fuel start control. As described above, the amount of power generated by the generator 22 is obtained by reversing the polarity of the output torque STG. If the output torque STG of the generator 22 when the starting of the internal combustion engine 10 is completed is less than a predetermined value A, the determination is made that the current fuel is of a light nature. In contrast, if the output torque STG of the generator 22 when the starting of the internal combustion engine 10 is completed is equal to or greater than the predetermined value A, the determination is made that the current fuel is of a heavy nature.

Figure 4:
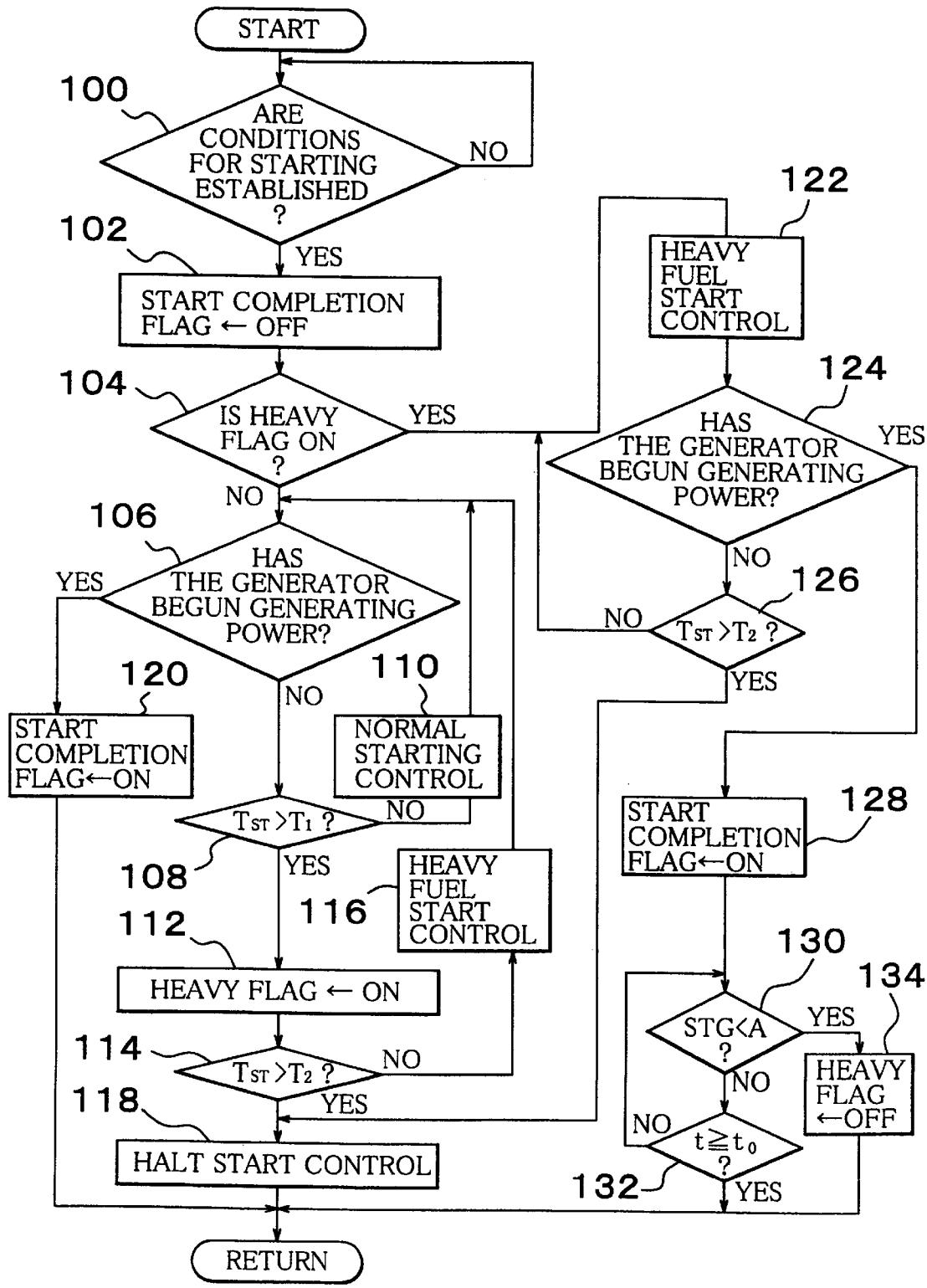
FIG. 4 is a flow chart of an example of a control routine executed in order to start an internal combustion engine in the present embodiment.

FIG. 4 shows a flow chart of an example of a control routine intended to start the internal combustion engine 10 executed by the ECU 12 in the present embodiment. The routine shown in FIG. 4 is started again each time the processing shown therein is completed. When the routine shown in FIG. 4 is started, firstly the processing of step 100 is performed.

In step 100, a determination is made as to whether or not the conditions for beginning the starting of the internal combustion engine 10 are established, specifically, whether or not the starter switch built into the IG switch 13 is on, while the shift lever is in the P range and the brake pedal is depressed. The processing of step 100 is repeated until the above conditions are established. When it is determined that the above conditions have been established, the routine proceeds to step 102.

In step 102, processing to reset ($X_{ST}$=OFF) the start completion flag $X_{ST}$ for the internal combustion engine 10 is performed. Note that the start completion flag $X_{ST}$ displays whether or not the starting of the internal combustion engine 10 is completed or not. Once the processing of step 102 is ended, the processing of step 104 is performed.

In step 104, a determination is made as to whether or not a heavy flag $X_{HD}$ has been set for the nature of the fuel supplied to the internal combustion engine 10. The heavy flag $X_{HD}$ displays whether or not the fuel is of a heavy nature. If it is determined that the heavy flag $X_{HD}$ is not set ($X_{HD}$=OFF), the processing of step 106 is executed.

In step 106, a determination is made as to whether or not power generation has begun in the generator 22 based on the output signals from the current detection circuit and voltage detection circuit for the generator 22 built into the inverter 26. Specifically, a determination is made as to whether or not a state where the generator 22 has switched from a state of being energized by the battery 28, so as to function as a starter motor, to a state of generating electrical power as a generator using the starting operation of the internal combustion engine 10 (namely, a state where the output torque STG of the generator 22 has changed from a positive value to a negative value) has continued for a predetermined length of time (e.g. 0.4 seconds). If it is determined that the generator 22 is not generating power, the processing of the next step 108 is performed.

In step 108, a determination is made as to whether or not the length of time $T_{ST}$ since the conditions for beginning the starting of the internal combustion engine 10 in step 100 were established has reached a predetermined time T1. When the fuel is of a light nature, the predetermined time T1 is the maximum allowable value for the time until the internal combustion engine 10 actually starts. If $T_{ST} \leq$ T1, there is no need to perform the heavy fuel start control for the internal combustion engine 10. Consequently, the processing of the next step 110 is performed.

In step 110, processing to begin normal start control for the internal combustion engine 10 is performed. After the processing of step 110, the processing of step 106 is performed again.

If TST>T1 in step 108, it is determined that the fuel supplied to the internal combustion engine 10 is of a heavy nature. Namely, it is determined that it is not possible to complete the starting of the internal combustion engine 10 using only the normal start control. In this case, because it is appropriate to perform heavy fuel start control for the internal combustion engine 10, the processing of the next step 112 is performed.

In step 112, processing to set the heavy flag $X_{HD}$ ($X_{HD}$=ON) is performed and the routine proceeds to the processing of step 114.

In step 114, a determination is made as to whether or not the length of time $T_{ST}$ since the conditions for beginning the starting of the internal combustion engine 10 in step 100 were established has reached a predetermined time T2. The predetermined time T2 is the minimum value for a time after which it can be determined that the power of the battery 28 will be consumed in excess if the start control is continued. Namely, if the internal combustion engine is not running even after the start control has been performed for a predetermined time, the time T2 is the time after which it is determined that the battery power will be wasted if the start control is continued further. If $T_{ST}$<T2, it is appropriate to perform heavy fuel start control for the internal combustion engine 10. Consequently, the processing of step 116 is performed.

In step 116, processing to begin heavy fuel start control for the internal combustion engine 10 is performed. Namely, compared with when the normal start control is performed in step 110, the above processings (1) to (3) are performed. Once the processing of step 116 is ended, the routine returns to step 106.

If, however, in step 114, $T_{ST}$>T2, then it is determined that a malfunction has occurred in the internal combustion engine 10. In this case, the starting of the internal combustion engine 10 should be brought to a rapid halt. Consequently, the routine proceeds to the processing of step 118.

In step 118, processing to halt the internal combustion engine 10 start control is performed and the current routine is ended.

If the generator 22 is generating power in step 106, it can be determined that the generator 22 is not being energized from the battery 28, but is rotating in accompaniment to the running of the internal combustion engine 10. Namely, it can be determined that the starting of the internal combustion engine 10 is completed (i.e. that the engine is already running). Consequently, the routine proceeds to the processing of the next step 120.

In step 120, processing is performed to set the start completion flag $X_{ST}$ for the internal combustion engine ($X_{ST}$=ON). Once the processing of step 120 is ended, the current routine is ended.

If it is determined that the heavy flag $X_{HD}$ is set ($X_{HD}$=ON) in step 104, the processing of the next step 122 is performed.

In step 122, processing to begin the heavy fuel start control for the internal combustion engine 10 is performed like step 116, and the routine proceeds to the processing of step 124.

In step 124, a determination is made as to whether or not power generation has begun in the generator 22 like step 106. If it is determined that the generator 22 is not generating power, the routine proceeds to the processing of step 126. In step 126, the same processing as in step 114 is performed. If, at this point, $T_{ST} \leq T2$, the routine returns to step 122 and the heavy fuel start control is continued. If $T_{ST}$>T2, the start control for the internal combustion engine 10 in step 118 is halted and the current routine is then ended.

In step 124, if it is determined that the generator 22 is generating power, the routine proceeds to step 128.

In step 128, processing to set the start completion flag $X_{ST}$ ($X_{ST}$=ON) for the internal combustion engine 10 is performed and the routine proceeds to the processing of step 130.

In step 130, a determination is made as to whether or not the output torque STG of the generator 22 is less than a predetermined value A. Note that the predetermined value A is the minimum value for the output torque STG at which it can be determined that the fuel is of a heavy nature when the heavy fuel start control is performed (i.e. the maximum value of the amount of generated power) and is preset as a negative value. If STG$\geq$A, the processing of the next step 132 is performed.

In step 132, a determination is made as to whether or not the length of the time t since the start completion flag $X_{ST}$ was set in step 128 has reached a predetermined time to. If t<t0, the processing of step 130 is repeated. If, however, t$\leq$t0, it can be determined that the amount of power generated by the generator 22 within the predetermined time t0 is not increasing and that the fuel is of a heavy nature. Consequently, the current routine is ended.

In step 130, if STG<A, it can be determined that the amount of power generated by the generator 22 is large and that the fuel is of a light nature. Accordingly, the processing of step 134 is performed.

In step 134, processing to reset the heavy flag $X_{HD}$ ($X_{HD}$=OFF) is performed and the current routine is ended.

According to the above processing, when starting the internal combustion engine 10, it is possible to perform start control corresponding to nature of the fuel used in the previous starting. Namely, the internal combustion engine is started by normal start control if the previous fuel was of a light nature, and by heavy fuel start control if the previous fuel was of a heavy nature. It is therefore possible to quickly complete the starting of the internal combustion engine 10.

Moreover, according to the above processing, when the internal combustion engine 10 is started by normal start control, it is possible to determine whether or not the fuel is of a heavy nature within the predetermined time T1 after the start. Further, if the starting of the internal combustion engine 10 is not completed (i.e. if the engine is not running) even when the normal start control is continued up until the predetermined time T1, the fuel is taken to be of a heavy nature and the heavy fuel start control can be performed instead of the normal start control. Namely, when the actual nature of the current fuel is heavy, yet the fuel used in the previous starting of the internal combustion engine 10 was of a light nature and the engine was started by normal start control, it is possible to alter the start control to one appropriate to the nature of the fuel. Accordingly, even if the fuel is of a heavy nature, it is possible to complete the starting of the internal combustion engine 10 quickly and reliably. It is moreover possible to ensure that the starting performance of the internal combustion engine 10 will be excellent regardless of the nature of the fuel.

Furthermore, according to the above processing, when the starting of the internal combustion engine 10 is begun using heavy fuel start control, it is possible to determine whether or not the fuel is of a heavy nature based on the output torque (i.e. the amount of power generated) from the generator 22 at the completion of the starting. As a result, according to the present embodiment, when the starting of the internal combustion engine 10 is begun using the heavy fuel start control, it is possible to avoid any inability to detect the nature of the current fuel and the nature of the fuel can be detected with a high degree of accuracy. Consequently, according to the system of the present embodiment, it is also possible to perform start control appropriate to the nature of the fuel for each subsequent starting of the internal combustion engine 10.

Further, in the present embodiment, after the starting of the internal combustion engine 10 has begun using either normal start control or heavy fuel start control, if the engine is not running within the predetermined time T2, then it is determined that the internal combustion engine 10 is not in a working condition and the start control is halted. As a result excessive power consumption of the battery 28 due to engine failure can be prevented.

Figure 5:
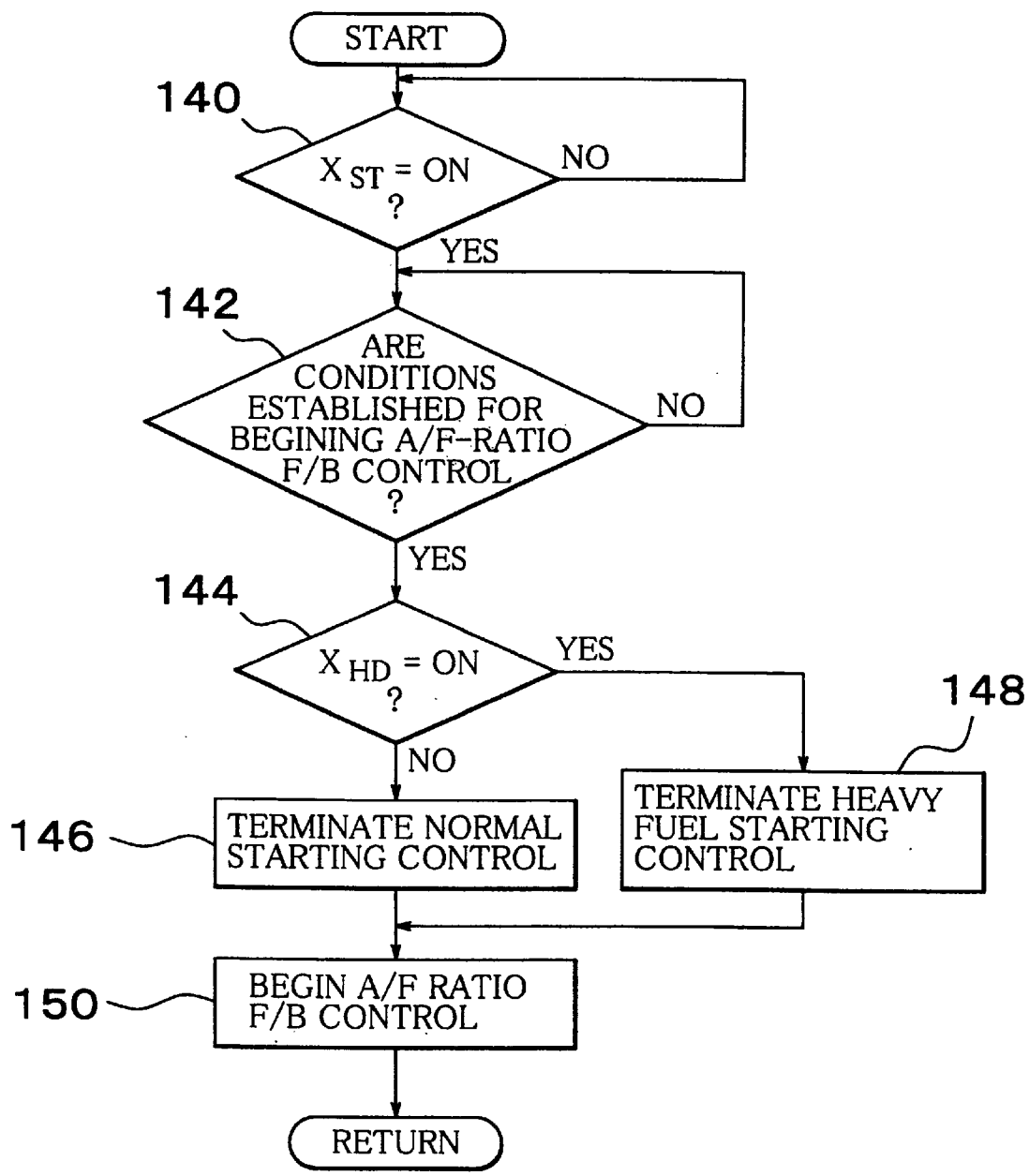
FIG. 5 is a flow chart of an example of a control routine executed in order to switch to air-fuel ratio feedback control from internal combustion engine start control in the present embodiment.

FIG. 5 is a flow chart of a control routine executed by the ECU 12 in the present embodiment in order to switch to air-fuel ratio feedback control from internal combustion engine 10 start control. This routine restarts each time the processing thereof ends. When the routine shown in FIG. 5 starts, firstly, the processing of step 140 is performed.

In step 140, a determination is made as to whether or not a start completion flag $X_{ST}$ is set ($X_{ST}$=ON) for the internal combustion engine 10 as a result of the processing of the routine shown in FIG. 4. This processing is repeated until the result of the determination is YES. Once it has been determined that the start completion flag $X_{ST}$ has been set, the routine proceeds to the next step 142.

In step 142, a determination is made as to whether or not air-fuel ratio F/B control start conditions are established. Specifically, a determination is made after the internal combustion engine 10 is running as to whether or not the water temperature THW of the cooling water flowing through the internal combustion engine 10 is above a predetermined temperature, and whether the air-fuel ratio of the internal combustion engine 10 is rich or lean in comparison with a target air-fuel ratio. This processing is repeated until the air-fuel ratio F/B control start conditions are established. When the start conditions are established, the routine proceeds to the next step 144.

In step 144, a determination is made as a result of the processing of the routine shown in FIG. 4 as to whether or not the fuel supplied to the internal combustion engine 10 is of a heavy nature ($X_{HD}$=ON). If it is determined that the fuel is not of a heavy nature, the processing of the next step 146 is performed. In step 146, processing to end the normal start control is performed and the routine proceeds to step 150.

If it is determined in step 144 that the fuel is of a heavy nature, the processing of step 148 is performed. In step 148, processing to end the heavy fuel start control is performed and the routine proceeds to step 150.

In step 150, air-fuel ratio F/B control is begun. As a result, the fuel injection in the internal combustion engine 10 is controlled so that the air-fuel ratio is set at the target air-fuel ratio. Once the processing in step 150 is ended, the current routine is ended.

According to the above processing, once the air-fuel ratio control start conditions are established after the internal combustion engine 10 is running, the start control for the internal combustion engine 10 is ended and the air-fuel ratio F/B control can be begun thereafter. The heavy fuel start control can be prevented from being performed over a long period of time. Consequently, the air-fuel ratio can be prevented from becoming too rich due to the heavy fuel start control being performed. Accordingly, a deterioration in the fuel consumption of the internal combustion engine 10 and a worsening in the exhaust emissions can both be prevented.

The points of the second embodiment of the present invention which differ from the first embodiment will now be described with reference made to FIGS. 6 to 8.

Figure 8:
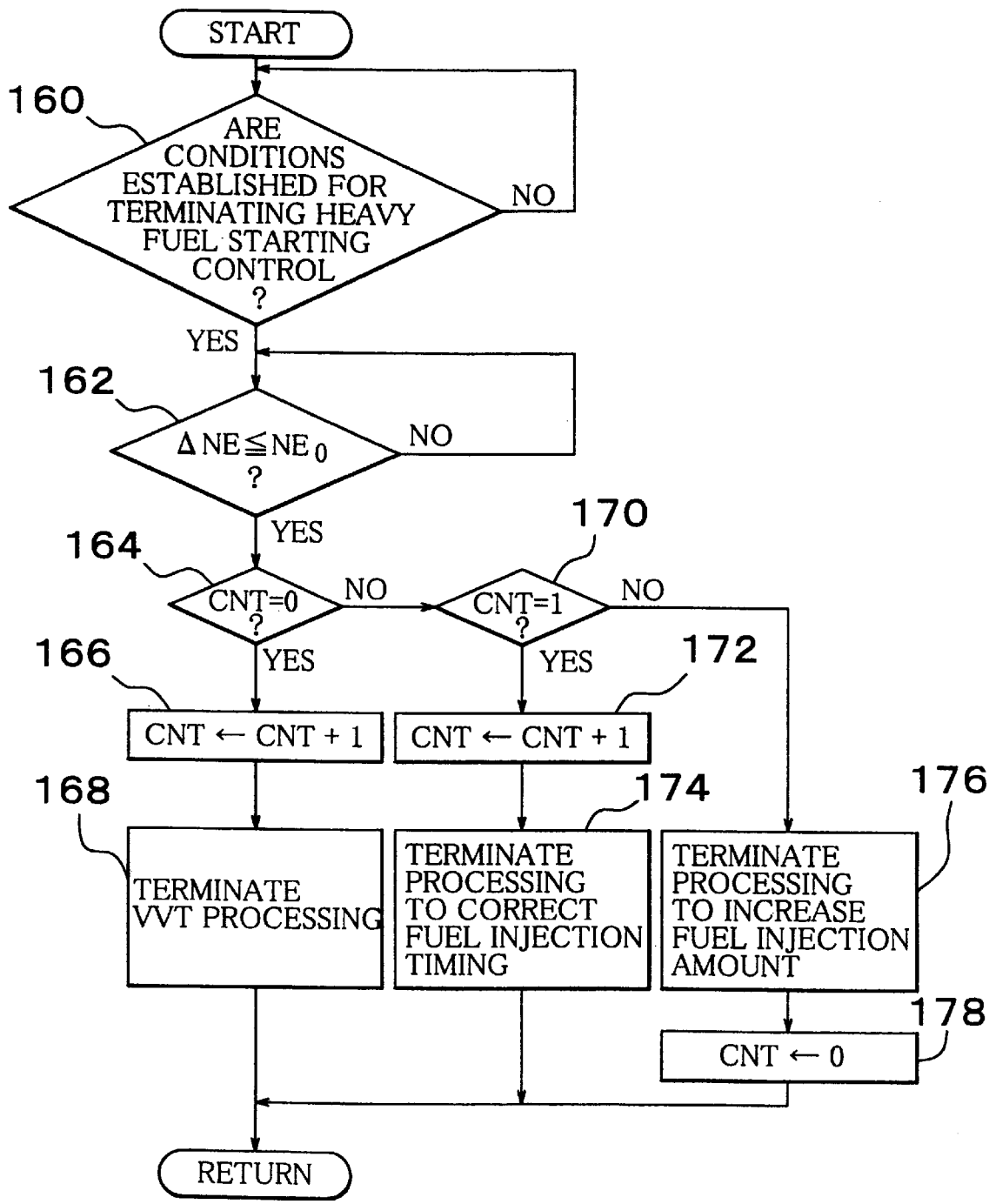
FIG. 8 is a flow chart showing a control routine executed when start control corresponding to a heavy fuel is terminated in the second embodiment of the present invention.

The system of the second embodiment is achieved by the routine shown in FIG. 8 being processed by the ECU 12 in the internal combustion engine 10 shown in FIGS. 1 and 2.

Figure 6:
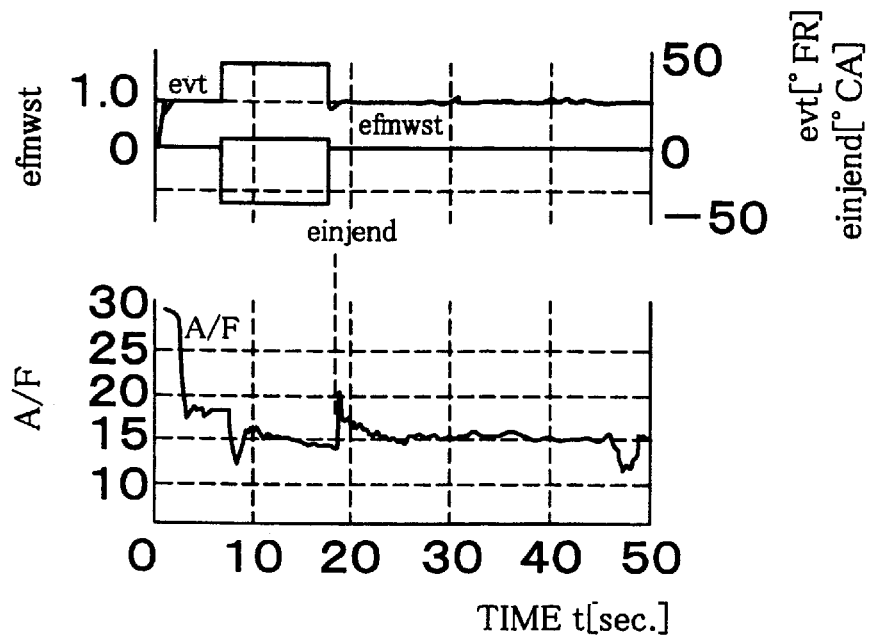
FIG. 6 is a time chart showing variations with time of an intake valve advance angle, a fuel injection termination angle, and a rate of increase in a fuel injection amount and air-fuel ratio.

FIG. 6 (the upper graph) shows the variations in time of the advance angle of the intake valve 52, evt, the fuel injection termination angle, einjend, and the rate of increase of the fuel injection amount, efmwst, when all the processings (the above (1) to (3)) included in the heavy fuel start control are ended at the same time at the ending of the heavy fuel start control. Also shown (the lower graph) are the variations in time in the air-fuel ratio of the internal combustion engine 10 obtained at the same time.

As is shown in FIG. 6, when the conditions for beginning the heavy fuel start control are established at approximately the time t=8, after the internal combustion engine 10 has been started at the time t=0, the advance angle evt of the intake valve 52 is increased, the fuel injection termination angle einjend is retarded, and the rate of increase of the fuel injection amount efmwst is increased. In this case, the valve overlap of the intake valve 52 and the exhaust valve 54 is enlarged and the fuel injection is performed while the intake valve 52 is open. Because of this and because the amount of fuel injection is increased, the starting of the internal combustion engine 10 can be quickly completed. In addition, after this, once the conditions for ending the heavy fuel start control have been established, each of the processings are ended at the same time and the start control for the internal combustion engine 10 is switched from heavy fuel start control to normal start control.

Once the heavy fuel start control has ended, namely, once the processing to reduce the enlarged valve overlap, the processing to perform the fuel injection, which is performed when the intake valve 52 is open, at the normal time, i.e., when the intake valve 52 is open, or the processing to reduce the increased fuel injection amount have ended, the air-fuel ratio in the internal combustion engine 10 moves towards the lean side. Therefore, as is shown in FIG. 6, if the heavy fuel start control is ended at approximately the time t=18, immediately thereafter the air-fuel ratio A/F in the internal combustion engine 10 becomes remarkably lean and the phenomenon of the mixture supplied to the internal combustion engine 10 not combusting, in other words, the phenomenon of misfiring occurs.

Accordingly, in order to prevent the occurrence of misfiring in the internal combustion engine 10 under the conditions for ending the heavy fuel start control, it is better not to end all the processings at the same time. Therefore, in the present embodiment, when ending the heavy fuel start control and returning to the normal start control, the endings of each of the processings are staggered in time relative to each other.

Figure 7:
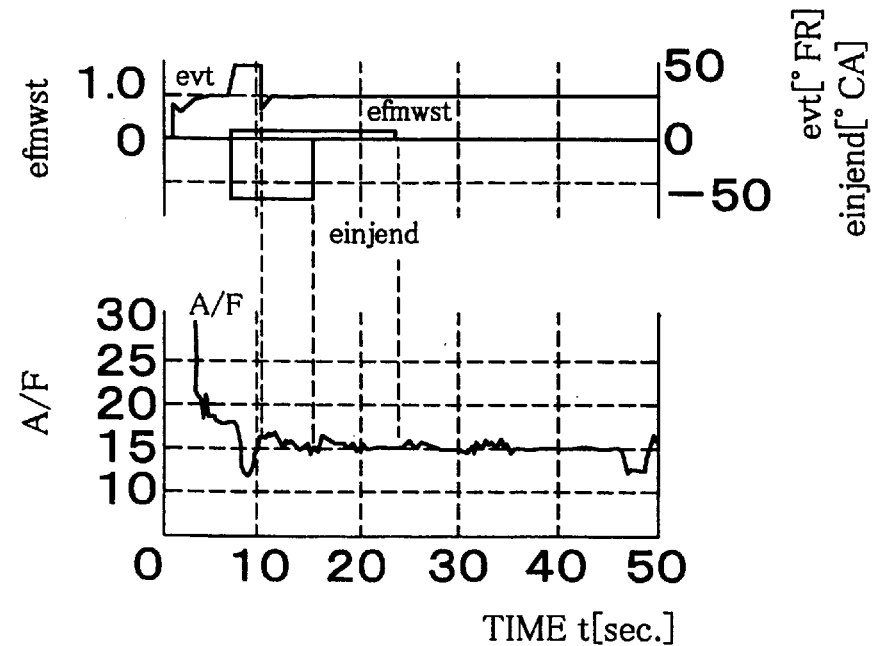
FIG. 7 is a further time chart showing variations with time of an intake valve advance angle, a fuel injection termination angle, and a rate of increase in a fuel injection amount and air-fuel ratio.

FIG. 7 (the upper graph) shows the variations in time of the advance angle of the intake valve 52, evt, the fuel injection termination angle, einjend, and the rate of increase of the fuel injection amount, efmwst, when the endings of each of the processings are staggered in time relative to each other at the ending of the heavy fuel start control. Also shown (the lower graph) are the variations in time of the air-fuel ratio A/F of the mixture supplied to the internal combustion engine 10 obtained in the above case.

In this case, because the degree to which the air-fuel ratio A/F becomes lean is small in each of the individual processings, taken as a whole, the situation where the air-fuel ratio A/F becomes markedly lean does not arise. Consequently, it is possible to prevent misfiring in the internal combustion engine 10 when ending the heavy fuel start control.

A flow chart for a control routine performed by the ECU 12 when heavy fuel start control is ended in the present embodiment is shown in FIG. 8. This routine is repeated each time the processing therein is ended. When this routine is begun, firstly, the processing of step 160 is performed.

In step 160, a determination is made as to whether or not conditions for ending the heavy fuel start control are established, specifically, whether or not the processing of step 148 in the routine shown in FIG. 5 has been performed. This processing is repeated until it is determined that the above conditions are established. When it is determined that conditions for ending the heavy fuel start control are established, the processing of the next step 162 is performed.

In step 162, a determination is made as to whether or not the amount of change $\Delta NE$ per unit time in the number of engine revolutions NE is less than or equal to a predetermined value $\Delta NE0$ ($\Delta NE \leq \Delta NE0$). The processing of step 162 is repeated until it is determined that $\Delta NE \leq \Delta NE0$. If $\Delta NE \leq \Delta NE0$, it can be determined after the internal combustion engine 10 is in operation that the operational state is stable. Under conditions such as these, even if all the processings of the heavy fuel start control are ended, any effects due to the ending of the processing are kept to a minimum.

Moreover, when all the processings of the heavy fuel start control are ended, because the air-fuel ratio A/F of the mixture supplied to the internal combustion engine 10 is fuel lean, the amount of change $\Delta NE$ temporarily increases. Therefore, even if only one threshold value $\Delta NE0$ is set, if the accumulated number of times the amount of change $\Delta NE$ which is equal to or below the threshold value $\Delta NE0$ are counted, it is possible to end each of the processings of the heavy fuel start control at staggered points in time.

In the present embodiment, after the conditions for ending the heavy fuel start control have been established, the accumulated number of times the amount of change ΔNE of the number of engine revolutions NE which are equal to or less than the predetermined value ΔNE0 are counted and each processing of the heavy fuel start control is ended in sequence each time the accumulated number of times is counted. Namely, if ΔNE≦ΔNE0 in step 162, the routine proceeds to the next step 164.

In step 164, a determination is made as to whether or not the discrete value of the accumulation counter CNT is zero. Note that the accumulation counter CNT counts the accumulated number of times it is determined that the conditions of step 162 are established, after the conditions for ending the heavy fuel start control have been established. When CNT=0 is established, it can be determined that none of the processings have ended after the conditions for ending the heavy fuel start control have been established. Accordingly, when it is determined that CNT=0 is established, then, in order to end the valve opening advance angle control, firstly the processing of step 166 is performed.

In step 166, processing is performed to increment the counter CNT. When this processing is performed, the accumulation counter CNT thereafter becomes CNT=1. The processing of the next step 168 is then performed.

In step 168, processing is performed to restore the opening/closing timing of the intake valve 52 which had been moved to the advance angle side to the normal timing. In this case, the valve overlap of the intake valve 52 and exhaust valve 54, which had been enlarged, is reduced. Once this processing has ended, the current routine is ended.

If it is determined in step 164 that CNT≠0, the processing of step 170 is performed.

In step 170, a determination is made as to whether or not the accumulation counter CNT is CNT=1. If CNT=1, then it can be determined that only the valve opening advance angle control has ended after the conditions for ending the heavy fuel start control are established. Consequently, the routine proceeds to the next step 172 in order to end the intake synchronized injection control.

In step 172, processing to increment the accumulation counter CNT is performed. Once this processing is performed, the accumulation counter CNT then becomes CNT=2. Once the processing of this step is ended, the processing of the next step 174 is performed.

In step 174, processing is performed to restore the fuel injection performed when the intake valve 52 was open to the normal timing and the current routine is ended.

If CNT≠1, in step 170, it can be determined that CNT=2 and, after conditions for ending the heavy fuel start control have been established, it can also be determined that the open valve advance angle control and intake synchronized injection control have ended. Consequently, the routine proceeds to step 176 in order to end the fuel injection amount increase control.

In step 176, processing is performed to restore the fuel injection amount, which had been increased, to the normal amount. Once the processing of step 176 is performed, all the processings of the heavy fuel start control are ended and the start control for the internal combustion engine 10 switches to normal start control. Once this step has ended, the processing of the next step 178 is performed.

In step 178, processing to reset the accumulation counter CNT to zero is performed and the current routine is ended.

According to the above processing, after the conditions for ending the heavy fuel start control have been established, it is possible to end each of the processings of the heavy fuel start control in the order of (1) valve opening advance angle control, (2) intake synchronized injection control, and (3) injection amount increase control each time the amount of change ΔNE of the number of engine revolutions NE goes below a predetermined value. Therefore, when ending the heavy fuel start control, all the processings do not have to be ended at the same time and the air-fuel ratio A/F of the mixture supplied to the internal combustion engine 10 can be prevented from becoming markedly fuel lean. Accordingly, the occurrence of misfiring in the internal combustion engine 10 caused by the ending of the heavy fuel start control can be reliably avoided.

Note that, in the second embodiment, each of the processings of the heavy fuel start control are ended in accordance with whether or not the amount of change ΔNE per unit time in the number of engine revolutions NE is less than or equal to a threshold value ΔNE0, however, the present invention is not limited to this. It is also possible to end each of the processings of the heavy fuel start control in accordance with the air-fuel ratio detected in the exhaust gas. Alternatively, it is also possible to end each of the processings of the heavy fuel start control in accordance with the accumulated intake air flow or accumulated fuel consumption or with the amount of change in the torque of the internal combustion engine 10.

Further, each of the processings of the heavy fuel start control were ended in a predetermined order each time the amount of change ΔNE was less than or equal to a threshold value ΔNE0, after the conditions for ending the heavy fuel start control had been established. However, it is also possible to provide three threshold values for ending each of the processings and ending each of the processings in stages. The order of ending the processings may also be set in any optional order.

The points of the third embodiment of the present invention which differ from the above embodiments will now be described with reference made to FIGS. 9 and 10. In the system of the third embodiment, the routine shown in FIG. 10 is performed by the ECU 12 in the internal combustion engine 10 shown in FIGS. 1 and 2 instead of the routine shown in FIG. 4.

As in the above first and second embodiments, once it is determined that the fuel is of a heavy nature, when injection amount increase control is performed as a heavy fuel start control corresponding to the heavy fuel, the concern exists when the fuel injection amount is increased that the fuel consumption and exhaust gas emissions will both deteriorate markedly. Accordingly, in order to avoid this type of disadvantage, it is better that the fuel injection amount is not increased when it has been determined that the fuel is of a heavy nature.

When performing fuel injection in the internal combustion engine 10 such that a fuel injection amount suitable for the volume of air intake can be ensured, if the volume of air intake is increased, namely, if the angle of the opening of the throttle valve 66 is increased, the fuel injection amount is increased as a consequence thereof. In the conditions existing when light fuel is being used in the internal combustion engine 10, even if the angle of the opening of the throttle valve 66 is comparatively small, namely, if the volume of air intake and the fuel injection amount are both small, the starting of the internal combustion engine 10 can be quickly completed. In the conditions existing when the fuel is of a heavy nature, if the volume of air intake and the fuel injection amount are both small, completing the starting of the internal combustion engine 10 becomes more difficult. On the other hand, the larger the volume of air intake and the fuel injection amount, the easier it becomes to complete the starting of the internal combustion engine 10.

Therefore, in the present embodiment, after the starting of the internal combustion engine 10 has begun, the angle of the throttle valve 66 is increased from the minimum angle at which internal combustion engine 10 can be quickly started when using light fuel to the maximum angle until the starting is completed. As a result, the volume of air intake into the internal combustion engine 10 is increased and the fuel injection amount is also increased to match the volume of air intake. Consequently, even if the fuel is of a heavy nature, the exhaust gas emissions can be maintained at an acceptable level while the starting of the internal combustion engine 10 can be guaranteed.

Figure 9:
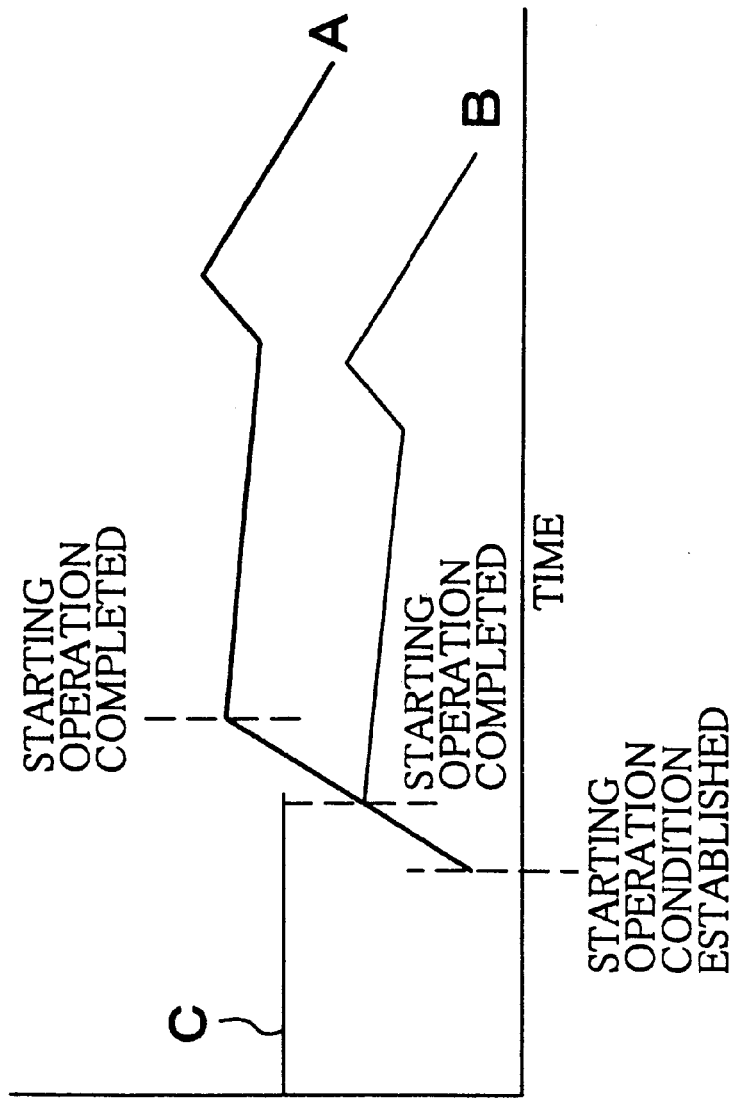
FIG. 9 is a time chart showing how the throttle opening angle changes with time after the starting of an internal combustion engine is begun.
Figure 10:
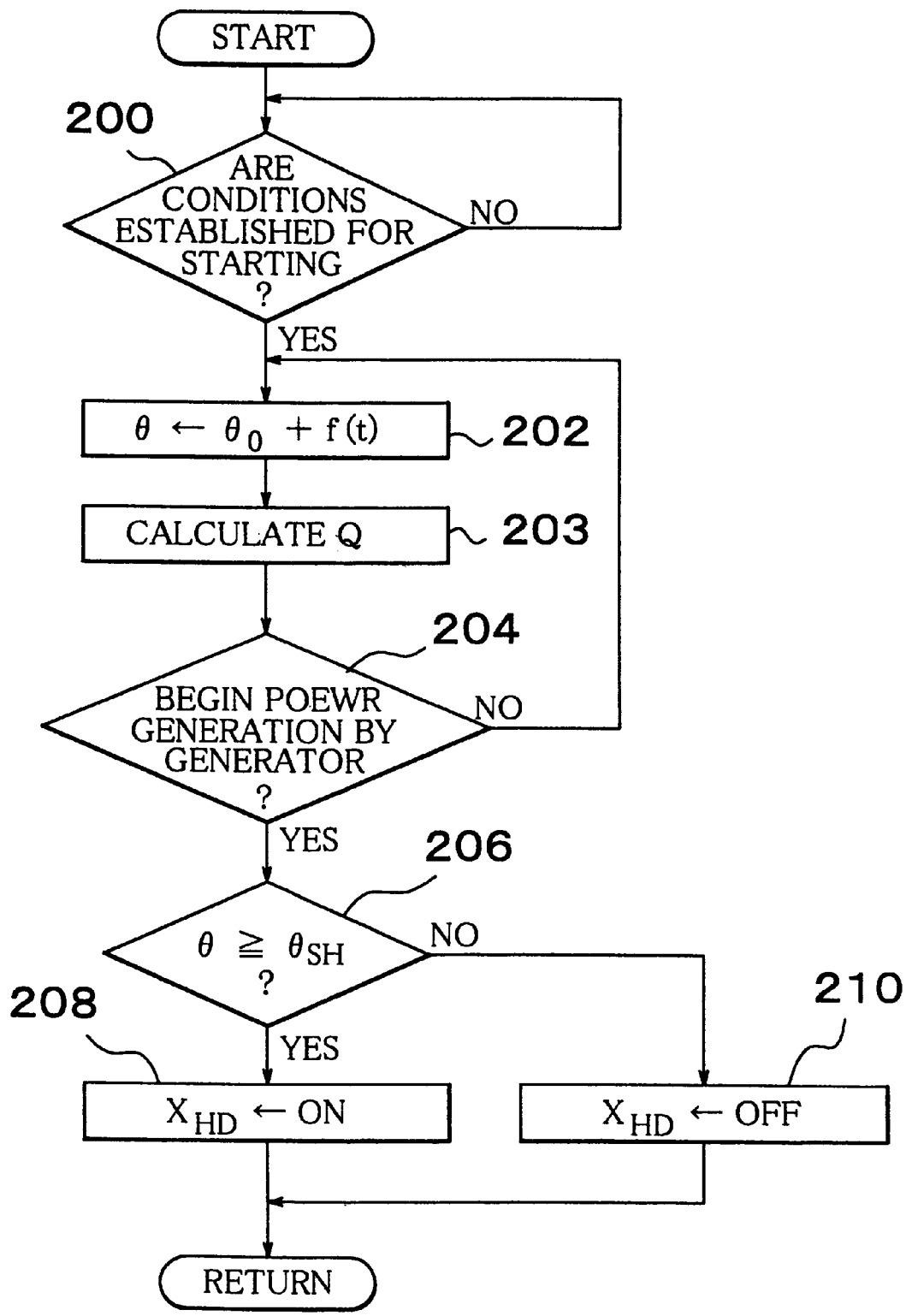
FIG. 10 is a flow chart of a control routine for determining fuel nature in the third embodiment of the present invention.

FIG. 9 is a time chart explaining the operation of the throttle valve 66 after the starting of the internal combustion engine 10 has begun. Note that, in FIG. 9, the throttle opening angle θ obtained under the conditions when the fuel is of a heavy nature is shown by the line A, while the throttle opening angle θ obtained under the conditions when the fuel is of a light nature is shown by the line B. Moreover, a threshold value for determining the nature of the fuel is shown by the line C. Note also that the throttle opening angle θ is increased linearly over time, however, it may also be increased in stages or parabolically.

In the present embodiment, the throttle valve 66 normally opens to match the accelerator pedal, as described above, and after the internal combustion engine 10 has been started, the throttle opening angle θ is increased at a predetermined rate until the internal combustion engine 10 is actually running. The injector 60 carries out the fuel injection in an amount appropriate to the angle at which the throttle valve 66 is open. When the throttle opening angle θ at the point in time when the starting of the internal combustion engine 10 is completed (the point when the engine begins to run) is comparatively small, it can be determined that the fuel is of a light nature. In contrast, when the throttle opening angle θ is comparatively large, it can be determined that the fuel is of a heavy nature.

FIG. 10 is a flow chart of a control routine performed by the ECU 12. This routine is repeated each time the processing thereof is ended. When the routine is started, firstly, the processing of step 200 is performed.

In step 200, like the earlier step 100, a determination is made as to whether or not conditions for beginning the starting of the internal combustion engine 10 are established. If it is determined that the conditions to begin the starting are established, the routine proceeds to step 202.

In step 202, the opening angle θ of the throttle valve 66 is set using the formula below, based on the initial value θ0.

$$\theta = \theta 0 + f(t)$$

The longer the time t since the establishment of the conditions for beginning the starting of the internal combustion engine 10, the larger the coefficient f(t). Note that the initial value θ0 is set at the estimated minimum value for the throttle angle θ at which the internal combustion engine 10 will start quickly when the fuel is of a light nature. When the processing of step 202 is performed, the opening amount of the throttle valve 66 becomes bigger as time passes and the volume of air taken into the internal combustion engine 10 increases.

Next, in step 203, the amount of fuel injection Q to be supplied to the internal combustion engine 10 is calculated based on the intake air volume VA and the number of engine revolutions NE. A drive signal is fed to the injector 60 such that the calculated fuel injection amount Q is maintained. When the processing of step 203 is performed, the fuel injection amount increases together with the volume of air intake.

Next, in step 204, a determination is made as to whether or not the generation of power has begun in the generator 22. Specifically, a determination is made as to whether or not the output torque STG of the generator 22 has changed from a positive value to a negative value and has remained that way for a predetermined length of time (for example, 0.4 seconds). When it is determined, as a result, that the generation of power has not begun in the generator 22, the routine returns to the processing of step 202. If, however, the generation of power has begun in the generator 22, because the generator 22 is generating power with the internal combustion engine 10 as the power source, it can be determined that the internal combustion engine 10 is running. In this case, the routine proceeds to step 206.

In step 206, a determination is made as to whether or not the throttle opening angle θ is equal to or greater than a threshold value $\theta_{SH}$. Note that the threshold value $\theta_{SH}$ is the minimum value for the throttle opening angle at which it is determined that the fuel is of a heavy nature. If $\theta<\theta_{SH}$, it can be determined that the internal combustion engine 10 is running even though the volume of air intake and the amount of fuel injection are comparatively small in the internal combustion engine 10 and thus that the fuel is of a light nature. The processing of step 210 is then performed.

In step 210, processing to reset the heavy flag $X_{HD}$ ($X_{HD}$=OFF) is performed and the current routine is ended.

When $\theta>\theta_{SH}$ in step 206, it can be determined that a comparatively large air intake volume and fuel injection amount will be necessary to bring the internal combustion engine 10 into operation and thus that the fuel is of a heavy nature. In this case, the routine proceeds to the processing of step 208.

In step 208, processing to reset the heavy flag $X_{HD}$ ($X_{HD}$=OFF) is performed and the current routine is ended.

According to the above, after the conditions to begin the starting of the internal combustion engine 10 have been established, the throttle opening angle θ can be enlarged in accordance with the time required until the engine is actually running. At the same time, the fuel injection amount Q can be set to a suitable value based on the volume of air intake VA. In this case, the volume of air taken into the internal combustion engine 10 increases and the amount of fuel injection increases in accordance with the volume of the air intake. Accordingly, even if the fuel is of a heavy nature, it is possible to ensure that the internal combustion engine 10 will begin operating. Moreover, because the fuel injection amount is set to an appropriate value in accordance with the volume of air intake, it is possible to maintain the exhaust gas emissions at a constantly acceptable level. Consequently, it is possible to guarantee that the internal combustion engine 10 will start while the exhaust gas emissions are kept at an acceptable level even when the fuel used is of a heavy nature.

In the present embodiment, the volume of air intake and the fuel injection amount both increase with time after starting is begun. Therefore, when the fuel is of a heavy nature, as in the first embodiment, in comparison with when the heavy fuel start control is begun after a predetermined time has passed after the start, it is possible to bring the internal combustion engine 10 into operation even sooner. Consequently, according to the system of the present embodiment, the time from when the internal combustion engine 10 is started until it is actually running can be shortened.

Further, in the present embodiment, as described above, the nature of the fuel can be determined by comparing the throttle opening angle at the completion of the starting (i.e. when the engine begins running) of the internal combustion engine 10 with a threshold value. Namely, when the throttle opening angle at the completion of the starting is less than the predetermined threshold value, it can be determined that the fuel is of a light nature. When the throttle opening angle at the completion of the starting is greater than the predetermined threshold value, it can be determined that the fuel is of a heavy nature. When it is determined here that the fuel is of a heavy nature, the concern exists that the air-fuel ratio of the mixture supplied to the internal combustion engine 10 when the engine is running will be lean because the throttle opening angle is large. Therefore, by applying a correction to the ignition timing, the amount of fuel injection and the like in accordance with the nature of the fuel determined when the internal combustion engine 10 is running, the air-fuel ratio can be prevented from becoming lean and the occurrence of misfiring in the internal combustion engine 10 can be prevented.

Next, the fourth embodiment of the present invention will be described with reference made to FIGS. 11 and 12. In the system of the fourth embodiment, the ECU 12 performs the routine shown in FIG. 12 in the internal combustion engine 10 shown in FIGS. 1 and 2.

At the completion of the starting of the internal combustion engine 10, in some cases control is performed to set the timing at which sparks are generated from the ignition plugs 56 (referred to below as the ignition timing (IT)) at a retarded angle (referred to below as ignition retard angle control) in order to achieve a reduction in the emissions and an improvement in the warm-up of the catalysts. When this ignition retard angle control is performed, the output torque of the internal combustion engine is reduced and the temperature of the exhaust gas is raised, resulting in the emissions being reduced during warm-up and the temperature of the catalysts rising.

When a generator 22 which uses the internal combustion engine 10 as a power source to generate electrical power is provided in the vehicle, if the ignition retard angle control is performed, then the amount of power generated by the generator 22 is also kept low regardless of the nature of the fuel. Namely, the amount of power generated by the generator 22 decreases in accordance with the retard angle of the ignition timing. Therefore, if the ignition retard angle control is performed when the nature of the fuel is determined by comparing the amount of power generated by the generator 22 at the completion of the starting with a fixed threshold value, it is possible that an erroneous determination that the fuel is of a heavy nature will be made when the amount of power generated by the generator 22 does not exceed the threshold value, even when the fuel is in reality of a light nature. In order, therefore, to accurately determine the nature of the fuel when ignition retard angle control is being performed, it is not appropriate for the threshold value for determining the nature of the fuel to be kept at a fixed value. Therefore, in the fourth embodiment, when ignition retard angle control is performed, the threshold value is kept small in accordance with the size of the retard angle of the ignition timing.

Figure 11:
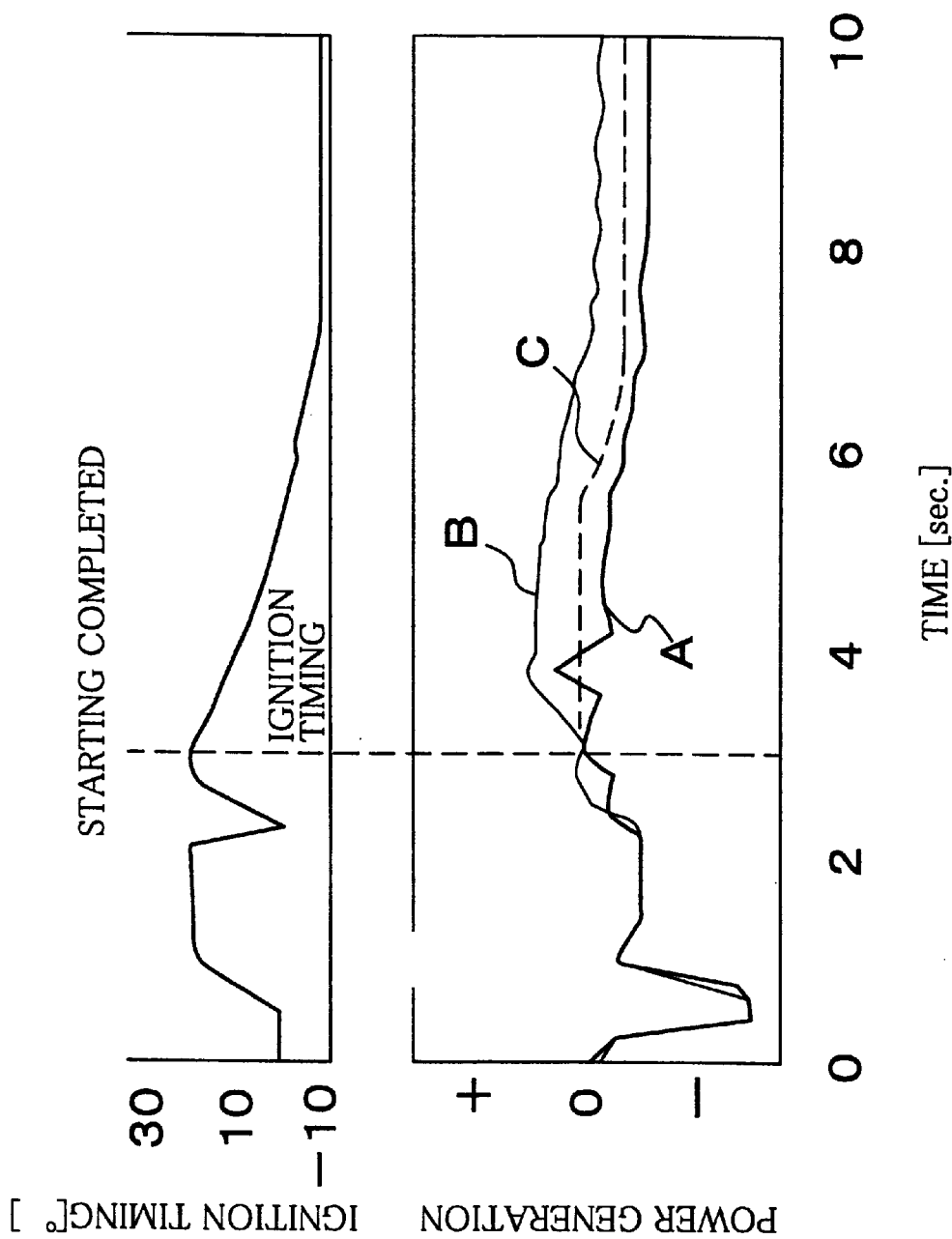
FIG. 11 is a time chart showing changes with time of an advance angle and retard angle of an ignition timing, and of an amount of energy generated by a generator.

FIG. 11 shows changes with time in the sizes of an advance angle and retard angle of an ignition timing (the upper graph), and changes with time in an amount of energy generated by the generator 22 (lower graph) when performing ignition retard angle control at the completion of starting of the internal combustion engine 10. Note that the amount of power generated by the generator 22 when the fuel is of a heavy nature is shown by line A, while the amount of power generated by the generator 22 when the fuel is of a light nature is shown by line B. The threshold value for determining the nature of the fuel is shown by line C.

As is shown in FIG. 11, after conditions for beginning the starting of the internal combustion engine 10 have been established (t=0),the starting is completed at approximately the time t=3. Thereafter, ignition retard angle control is performed in order to reduce emissions and improve the warming up of the catalyst. If ignition retard angle control is performed, the output torque of the internal combustion engine 10 is reduced and the temperature of the exhaust gas is raised. As a result, emissions during warming up are reduced and the catalytic temperature can be increased.

The amount of power generated by the generator 22 using the internal combustion engine 10 as a power source decreases as the output torque of the internal combustion engine 10 decreases. Consequently, the larger the retard angle of the ignition timing is made by the ignition retard angle control, the more the output torque of the internal combustion engine 10 decreases. As is shown in FIG. 11, from approximately the time t=5.0 onwards, the amount of power generated by the generator 22 decreases regardless of the nature of the fuel supplied to the internal combustion engine 10.

In the present embodiment, as is shown in FIG. 11, after the ignition retard angle control is begun, after the delay time, in which it is estimated that the amount of power generated by the generator 22 will change, has passed, the threshold value for determining the nature of the fuel is altered to a small value in accordance with the retard angle of the ignition timing.

Figure 12:
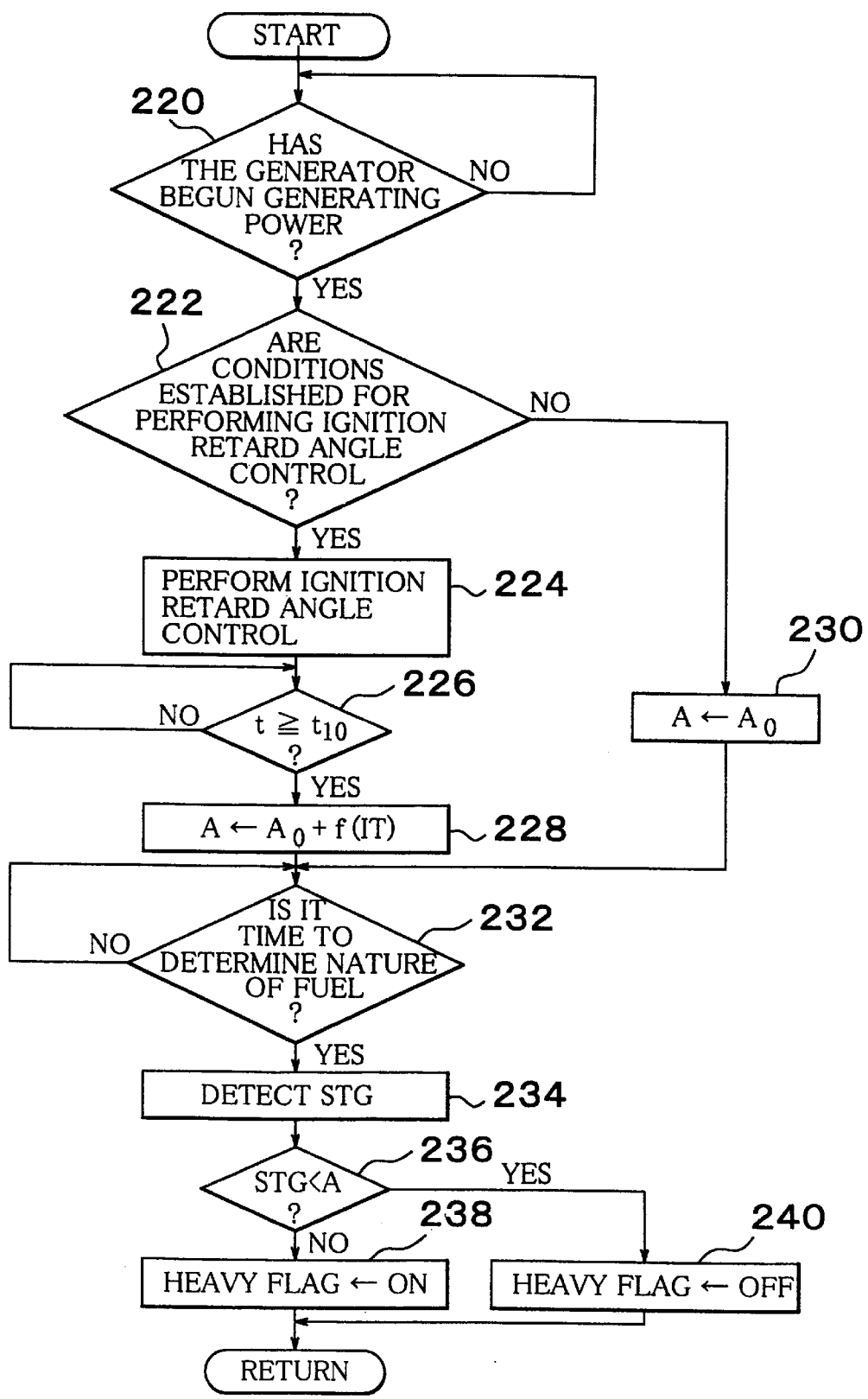
FIG. 12 is a flow chart of a control routine for determining fuel nature in the fourth embodiment of the present invention.

FIG. 12 is a flow chart showing a control routine performed by the ECU 12 in the present embodiment. This routine is repeated each time the processing thereof is completed. When the routine is begun, firstly, the processing of step 220 is performed.

In step 220, a determination is made as to whether or not power generation has begun in the generator 22. Specifically, a determination is made as to whether or not the output torque STG of the generator 22 has changed from a positive value to a negative value and has remained that way for a predetermined length of time (for example, 0.4 seconds). This processing is repeated until it is determined that the generator 22 is generating power. Once the generator 22 has begun generating power (namely, once the internal combustion engine 10 is running), the processing of step 222 is performed.

In step 222, a determination is made as to whether or not conditions for performing ignition retard angle control have been established, based on output signals from each of the various sensors in the internal combustion engine 10. If it is determined that the necessary conditions have been established, the processing of the next step 224 is performed.

In step 224, ignition retard angle control is performed to retard the ignition timing such that the spark of the ignition plug is generated on the retard angle side of the internal combustion engine 10.

In step 226, a determination is made as to whether or not the length of time t which has passed since the ignition retard angle control was performed is equal to or greater than a predetermined length of time t10. Note that the predetermined time t10 is the minimum time at which it can be determined that the amount of power actually generated by the generator 22 due to the ignition timing retard angle is reduced (namely, the output torque STG of the generator 22 is increased) after the ignition timing is begun at a retarded angle by ignition retard angle control. This processing is repeated until t≧t10. If t≧t10, it can be determined that the amount of power generated by the generator 22 (the output torque) is being changed by the ignition retard angle control. In the case where t≧t10, the routine proceeds to the next step 228.

In step 228, the threshold value A of the output torque STG of the generator 22 used for determining the nature of the fuel is set in accordance with the following formula, based on an initial value A0 (a threshold value for determining the nature of the fuel when ignition retard angle control is not performed).

$$A = A0 + f(IT)$$

Wherein the coefficient f (IT) increases as the size of the retard angle of the ignition timing IT increases. Once the processing of step 228 is ended, the processing of the next step 232 is performed.

If, however, in step 222, conditions for performing ignition retard angle control have not been established after the starting of the internal combustion engine 10 has begun (i.e. if there is no need to perform the control), then there is no need to alter the threshold value for determining the nature of the fuel. Accordingly, the processing of the next step 230 is performed.

In step 230, the threshold value A for determining the nature of the fuel is set to the initial value A0 and the routine proceeds to step 232.

In step 232, a determination is made as to whether or not the current point in time is the time to determine the nature of the fuel. Specifically, a determination is made as to whether or not a set time has passed since the completion of the starting of the internal combustion engine 10. This processing is repeated until the conditions are established (i.e. until the set time has elapsed). When the result is that it is determined that the time to determine the nature of the fuel has been reached, the processing of the next step 234 is performed.

In step 234, the output torque STG of the generator 22 is detected based on output signals from a current detection circuit and voltage detection circuit built into the inverter 26.

In step 236, a comparison is made between the output torque STG of the generator 22 detected in step 234 and the threshold value A set in step 228 or 230. If STG>A (NO), the processing of step 238 is performed. If STG<A (YES), the processing of step 240 is performed.

In step 238, processing to set the heavy flag $X_{HD}$ is performed and the current routine is ended.

In step 240, processing to reset the heavy flag $X_{HD}$ is performed and the current routine is ended.

According to the above described processing sequence, when ignition retard angle processing is not performed after the starting of the internal combustion engine 10 has begun, the threshold value for determining the nature of the fuel is kept at a fixed value. When ignition retard angle control is performed, the threshold value can be altered in accordance with the size of the retard angle of the ignition timing. Therefore, even if variations in the amount of power generated by the generator 22 after the starting has begun caused by the retard angle of the ignition timing set by the ignition retard angle control arise, the nature of the fuel supplied to the internal combustion engine 10 can be accurately determined based on the amount of power generated by the generator 22. Accordingly, in the present embodiment, if corrections in accordance with the nature of the fuel are made to the fuel injection amount, ignition timing and the like after the nature of the fuel has been determined, it is possible to perform these corrections appropriately.

Generally, an internal combustion engine 10 runs in an unstable running condition immediately after the completion of the starting (i.e. immediately after beginning operation). Therefore, if the nature of the fuel is determined based on the amount of power generated by the generator 22 using the internal combustion engine 10 as a power source, it is better if the determination is not made immediately after the completion of the starting of the internal combustion engine 10. Moreover, if ignition retard angle control is performed, then, as described above, the amount of power generated by the generator 22, after the lapse of a delay time after the control is begun, varies due to the angle of the ignition timing being retarded. Therefore, it is better if the nature of the fuel is not determined after the lapse of a delay time after the beginning of the ignition retard angle control using a set threshold value. Namely, the time in which the nature of the fuel can be accurately determined ends up being restricted to a short period of time.

In contrast to this, in the fourth embodiment, the threshold value is altered in accordance with the size of the retard angle of the ignition timing after the lapse of a set length of time after the start of the ignition retard angle control. In this case, even if the amount of power generated by the generator 22 under the effects of the ignition retard angle control varies, it is still possible to accurately determine the nature of the fuel. Consequently, the length of time for the nature of the fuel to be accurately determined after the completion of the starting of the internal combustion engine 10 is greatly extended, and it is possible to improve the accuracy when determining the nature of the fuel.

Note that, in the fourth embodiment, by altering the threshold value used to determine the nature of the fuel when ignition timing retard angle control is performed so as to obtain an improvement in the warming up of the catalyst, mistakes when determining the nature of the fuel can be prevented. However, the method of preventing mistakes in the determination of the nature of the fuel is not limited to this embodiment. For example, it is also possible to prohibit any determining of the nature of the fuel when performing ignition timing retard angle control.

Further, in the fourth embodiment, the threshold value for determining the nature of the fuel is altered when ignition retard angle control is performed, however, it is possible to alter the threshold value when control other than the ignition retard angle control is performed provided that the control is such that the output torque of the internal combustion engine 10 is kept small.

In each of the above embodiments, a determination was made based on whether or not the generation of power by the generator 22 had begun as to whether or not the starting of the internal combustion engine 10 was completed, however, the determination of whether or not the starting is completed may also be made based on an output of the internal combustion engine 10, such as the number of engine revolutions NE or the like.

What is claimed is:

1. A starting operation control apparatus for an internal combustion engine comprising:
   a controller that capably selects and executes a starting operation from at least a first and second starting operation in accordance with a nature of fuel supplied to an internal combustion engine; and a sensor that detects a running state of the internal combustion engine, wherein the controller switches the starting operation to the second starting operation when the sensor does not detect that the internal combustion engine is running within a predetermined time after starting of the internal combustion engine is begun using the first starting operation.

2. The control apparatus according to claim 1, wherein the controller selects the first starting operation when high volatility fuel is used and the second starting operation when low volatility fuel is used.

3. The control apparatus according to claim 2 further comprising:

a fuel nature deteminator that determines the nature of fuel based on an amount of power generated by a generator, which generates power using the internal combustion engine as a power source, after the sensor has detected that the internal combustion engine is running when the internal combustion engine is started using the second starting operation; and a storage device that stores the nature of the fuel which has been determined, wherein the controller selects a starting operation in accordance with the nature of the fuel stored in the storage device when starting the internal combustion engine.

4. The control apparatus according to claim 3, wherein the fuel nature deteminator uses a predetermined threshold value to determine the nature of the fuel.

5. The control apparatus according to claim 4 further comprising: a torque controller that limits torque output from the internal combustion engine after the internal combustion engine is running, wherein the fuel nature deteminator alters the threshold value when the torque controller limits the output torque.

6. The control apparatus according to claim 4 further comprising: a torque controller that limits torque output from the internal combustion engine after the internal combustion engine is running, wherein the fuel nature deteminator halts the determination of the nature of the fuel when the output torque has been limited by the torque controller.

7. The control apparatus according to claim 4 further comprising: an air-fuel ratio controller that performs feedback control relative to a target value on an air-fuel ratio of fuel gas fed to the internal combustion engine, wherein, when an internal combustion engine is started using the second start control, the air-fuel ratio controller performs feedback control after the second start control is terminated.

8. The control apparatus according to claim 2 further comprising: an air-fuel ratio controller that performs feedback control relative to a target value on an air-fuel ratio of fuel gas fed to the internal combustion engine, wherein, when an internal combustion engine is started using the second start control, the air-fuel ratio controller performs feedback control after the second start control is terminated.

9. The control apparatus according to claim 2, wherein the second start control includes a plurality of processings and each processing is terminated at a different time to the other processings.

10. A start operation control method for an internal combustion engine comprising:

selecting a starting operation from at least a first and second starting operation based on the nature of fuel supplied to an internal combustion engine;

detecting a running state of the internal combustion engine; and switching the starting operation from the first starting operation to the second starting operation, when the running state of the internal combustion engine has not been detected within a predetermined time after starting of the internal combustion engine is begun using the first starting operation.

11. The control method according to claim 10, wherein the first starting operation is selected when high volatility fuel is used and the second starting operation is selected when low volatility fuel is used.

12. The control method according to claim 11 further comprising:

determining the nature of fuel based on an amount of power generated by a generator, which generates power using the internal combustion engine as a power source, after the running of the internal combustion engine has been detected when the internal combustion engine is started using the second starting operation;

storing the nature of the fuel which has been determined; and selecting a starting operation in accordance with the stored nature of the fuel when starting the internal combustion engine.

13. The control method according to claim 12, wherein the fuel nature is determined using a predetermined threshold value.

14. The control method according to claim 13 further comprising the steps of: limiting torque output from the internal combustion engine after the internal combustion engine is running, and altering the threshold value after the output torque has been limited.

15. The control method according to claim 13 further comprising:

limiting torque output from the internal combustion engine after the internal combustion engine is running; and halting the determining of the nature of the fuel for the engine while the output torque is limited.

16. The control method according to claim 13 further comprising:

performing feedback control relative to a target value on an air-fuel ratio of fuel gas fed to the internal combustion engine, and terminating the second start control before the feedback control is begun when an internal combustion engine is started using the second start control.

17. The control method according to claim 11 further comprising:

performing feedback control relative to a target value on an air-fuel ratio of fuel gas fed to the internal combustion engine; and terminating the second start control before the feedback control is begun when an internal combustion engine is started using the second start control.

18. The control method according to claim 11, wherein the second start control includes a plurality of processings and each processing is terminated at a different time to the other processings.

* * * * *